(12) United States Patent
Chiao et al.

(10) Patent No.: US 12,438,394 B2
(45) Date of Patent: Oct. 7, 2025

(54) RESONANT COUPLER SYSTEMS AND METHODS FOR IMPLANTS

(71) Applicant: Southern Methodist University, Dallas, TX (US)

(72) Inventors: Jungchih Chiao, Grand Prairie, TX (US); Sen Bing, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 29 days.

(21) Appl. No.: 17/808,033

(22) Filed: Jun. 21, 2022

(65) Prior Publication Data

US 2022/0407360 A1    Dec. 22, 2022

Related U.S. Application Data

(60) Provisional application No. 63/213,583, filed on Jun. 22, 2021.

(51) Int. Cl.
  *H02J 50/12*    (2016.01)
  *H01F 38/14*    (2006.01)
  *H04B 5/79*    (2024.01)

(52) U.S. Cl.
  CPC ............... *H02J 50/12* (2016.02); *H04B 5/79* (2024.01); *H01F 38/14* (2013.01)

(58) Field of Classification Search
  CPC ........ H02J 50/12; H01P 1/20381; H01P 7/00; H01P 7/08; H01P 1/00
  See application file for complete search history.

(56) References Cited

U.S. PATENT DOCUMENTS

| | | | |
|---|---|---|---|
| 8,299,877 B2 * | 10/2012 | Hong | H01P 1/218 333/219.2 |
| 2001/0050651 A1 * | 12/2001 | Grangeat | H01Q 13/106 343/769 |

(Continued)

OTHER PUBLICATIONS

Abejon, D.; Vancamp, T.; Monzon, E.M. A Cost-Consequence Analysis Examining the Differences Between Non-Rechargeable and Rechargeable Systems. Anesthesiology and Pain Medicine Feb. 2020, 10, e100308.

(Continued)

*Primary Examiner* — Rexford N Barnie
*Assistant Examiner* — Joseph N Inge
(74) *Attorney, Agent, or Firm* — Edwin S Flores; Daniel J. Chalker; Chalker Flores, LLP

(57) ABSTRACT

A planar inductive resonant coupler comprising a circular planar loop antenna; and an element disposed within and co-planar with a loop formed by the antenna; wherein one or more antenna or element dimensions are sized to tune a coupler resonance of the coupler. A method of locating a subcutaneous planar inductive resonant coupler including: providing the subcutaneous planar inductive resonant coupler; providing a locating device configured to couple with the subcutaneous planar inductive resonant coupler; placing the locating device within a coupling range of the subcutaneous planar inductive resonant coupler; plotting a location for each of one or more resonant frequencies of the locating device with respect to a surface under which the subcutaneous planar inductive resonant coupler is expected to be located; and identifying a location for a specific resonant frequency of the subcutaneous planar inductive resonant coupler on the surface.

7 Claims, 15 Drawing Sheets

(56) References Cited

U.S. PATENT DOCUMENTS

| | | | | |
|---|---|---|---|---|
| 2004/0247008 | A1* | 12/2004 | Scheuer | H01S 5/1071 372/94 |
| 2007/0024399 | A1* | 2/2007 | Martin Antolin | H01P 1/2013 333/205 |
| 2007/0170996 | A1* | 7/2007 | Dutton | H01J 37/32192 331/126 |
| 2007/0176600 | A1* | 8/2007 | Laubacher | G01R 33/3642 324/309 |
| 2009/0230777 | A1* | 9/2009 | Baarman | H04B 5/77 307/104 |
| 2010/0090903 | A1* | 4/2010 | Byun | H01Q 9/0414 343/700 MS |
| 2010/0091370 | A1* | 4/2010 | Mahrt | G02B 5/1876 359/574 |
| 2011/0018775 | A1* | 1/2011 | Brown | H01Q 9/04 343/748 |
| 2012/0007787 | A1* | 1/2012 | Schantz | G01S 5/14 343/788 |
| 2013/0222202 | A1* | 8/2013 | Lam | H01Q 9/0428 343/836 |
| 2013/0328408 | A1* | 12/2013 | Georgakopoulos | H01F 27/006 307/104 |
| 2015/0303824 | A1* | 10/2015 | Celani | H02M 7/217 307/104 |
| 2016/0072296 | A1* | 3/2016 | Nejatali | H01F 27/36 307/104 |
| 2016/0156103 | A1* | 6/2016 | Bae | H02J 50/70 343/788 |
| 2016/0301253 | A1* | 10/2016 | Kurs | H02J 7/0048 |
| 2021/0020348 | A1* | 1/2021 | Luzinski | H01F 38/14 |
| 2022/0052559 | A1* | 2/2022 | Hameed | H02J 50/12 |

OTHER PUBLICATIONS

Belongie, S., Malik, J. and Puzicha, J. Shape matching and object recognition using shape contexts. IEEE transactions 508 on pattern analysis and machine intelligence 2002, 24(4), pp. 509-522.

Bing, S., Chawang, K. and Chiao, J.C., Resonant Coupler Designs for Subcutaneous Implants. Proceedings of the 2021 IEEE Wireless Power Transfer Conference, Wireless Power Week. Jun. 1-4, 2021. pp. 1-4.

Bose, P.; Khaleghi, A.; Albatat, M.; Bergsland, J.; Balasingham, I. RF Channel Modeling for Implant-to-Implant Communication and Implant to Subcutaneous Implant Communication for Future Leadless Cardiac Pacemakers. IEEE Transactions on Biomedical Engineering 2018, 65, 2798-2807.

Campi, T.; Cruciani, S.; Palandrani, F.; De Santis, V.; Hirata, A.; Feliziani, M. Wireless Power Transfer Charging System for AIMDs and Pacemakers. IEEE Transactions on Microwave Theory and Techniques 2016, 64, 633-642.

Clingan, J.A.; Patel, A.; Maher, D.P. Survey of Spinal Cord Stimulation Hardware Currently Available for the Treatment of Chronic Pain in the United States. Front.Pain Res.1: 572907 2020.

Clinical Trial: Neuspera's Implantable Sacral Nerve Stimulation System in Patients with Symptoms of Overactive Bladder. US Fed News Service, US State News 2020.

Davies, C.; Komoroski, C.; Roy, L. Evaluation of An Innovative Spinal Cord Stimulator Platform for The Treatment of Chronic Pain. Pain Management (London) 2018, 8, 167-174.

Dawood, A.; Brown, J.; Sauret-Jackson, V.; Purkayastha, S. Optimization of Cone Beam CT Exposure for Pre-surgical Evaluation of the Implant Site. Dento-maxillo-facial Radiology 2012, 41, 70-74.

Deb, S.; Tang, S.; Abell, T.L.; McLawhorn, T.; Huang, W.; Lahr, C.; To, S.D.F.; Easter, J.; Chiao, J. Development of Innovative Techniques for the Endoscopic Implantation and Securing of a Novel, Wireless, Miniature Gastrostimulator (with videos). Gastrointestinal Endoscopy 2012, 76, 179-184.

Deb, S.; Tang, S.; Abell, T.L.; Rao, S.; Huang, W.; To, S.D.F.; Lahr, C.; Chiao, J. An Endoscopic Wireless Gastrostimulator (with video). Gastrointestinal Endoscopy 2012, 75, 411-415.e1.

Gonzalez, A.; Goikolea, E.; Barrena, J.A.; Mysyk, R. Review on Supercapacitors: Technologies and Materials. Renewable & Sustainable Energy Reviews 2016, 58, 1189-1206.

Goroszeniuk, T.; Kothari, S.; Hamann, W. Subcutaneous Neuromodulating Implant Targeted at the Site of Pain. Regional Anesthesia and Pain Medicine 2006, 31, 168-171.

Gunasekaran, N.; Mallikarjunan, P.; Eifert, J.; Sumner, S. Effect of Fat Content and Temperature on Dielectric Properties of Ground Beef. Transactions of the ASAE, 48, 673-680.

Hornberger, J.; Kumar, K.; Verhulst, E.; Clark, M.A.; Hernandez, J. Rechargeable Spinal Cord Stimulation Versus Nonrechargeable System for Patients With Failed Back Surgery Syndrome: A Cost-Consequences Analysis. The Clinical Journal of Pain 2008, 24, 244-252.

Jia, F.; Hao, H.; Meng, F.; Guo, Y.; Zhang, S.; Zhang, J.; Li, L. Patient Perspectives on the Efficacy of A New Kind of Rechargeable Deep Brain Stimulators1. International Journal of Neuroscience 2016, 126, 996-1001.

Lam, C.K.; Rosenow, J.M. Patient Perspectives on the Efficacy and Ergonomics of Rechargeable Spinal Cord Stimulators. Neuromodulation (Malden, Mass.) 2010, 13, 218-223.

Lee, C.H.; Kim, H.; Harburg, D.V.; Park, G.; Ma, Y.; Pan, T.; Kim, J.S.; Lee, N.Y.; Kim, B.H.; Jang, K.; Kang, S.; Huang, Y.; Kim, J.; Lee, K.; Leal, C.; Rogers, J.A. Biological Lipid Membranes for On-demand, Wireless Drug Delivery from Thin, Bioresorbable Electronic Implants. NPG Asia Materials 2015, 7, e227.

Liu, Y.; Xie, D.; Zhou, R.; Zhang, Y. 3D X-ray Micro-computed Tomography Imaging for the Microarchitecture Evaluation of Porous Metallic Implants and Scaffolds. Micron 2021, 142, 102994.

Liu, J.J.; Lutkin, J.E. Imaging of Patients Having Metal Implant Using X-ray Computed Tomography. Journal of X-ray Science and Technology 2009, 17, 355-365.

Lyng, J.G.; Zhang, L.; Brunton, N.P. A Survey of the Dielectric Properties of Meats and Ingredients Used in Meat Product Manufacture. Meat Science 2005, 69, 589-602.

McKinley, A.F.; White, T.P.; Maksymov, I.S.; Catchpole, K.R. The Analytical Basis for the Resonances and Anti-resonances of Loop Antennas and Meta-material Ring Resonators. Journal of Applied Physics 2012, 112, 94911.

Neihart, N.M.; Harrison, R.R. Micropower Circuits for Bidirectional Wireless Telemetry in Neural Recording Applications. IEEE Transactions on Biomedical Engineering 2005, 52, 1950-1959.

Ng, S.K.; Gibson, A.; Parkinson, G.; Haigh, A.; Ainsworth, P.; Plunkett, A. Bimodal Method of Determining Fat and Salt Content in Beef Products by Microwave Techniques. IEEE Transactions on Instrumentation and Measurement 2009, 58, 3778-3787.

Park, G.; Chung, H.; Kim, K.; Lim, S.A.; Kim, J.; Kim, Y.; Liu, Y.; Yeo, W.; Kim, R.; Kim, S.S.; Kim, J.; Jung, Y.H.; Kim, T.; Yee, C.; Rogers, J.A.; Lee, K. Immunologic and Tissue Biocompatibility of Flexible/Stretchable Electronics and Optoelectronics. Advanced Healthcare Materials 2014, 3, 515-525.

Poonam; Sharma, K.; Arora, A.; Tripathi, S.K. Review of Supercapacitors: Materials and Devices. Journal of Energy Storage 2019, 21, 801-825.

Ramrakhyani, A.K.; Mirabbasi, S.; Mu Chiao Design and Optimization of Resonance-Based Efficient Wireless Power Delivery Systems for Biomedical Implants. IEEE Transactions on Biomedical Circuits and Systems 2011, 5, 48-63.

Rao, S.; Dubey, S.; Deb, S.; Hughes, Z.; Seo, Y.; Nguyen, M.; Tang, S.; Abell, T.; Lahr, C.; Chiao, J. Wireless 449 Gastric Stimulators. Texas Symposium on Wireless and Microwave Circuits and Systems Jan. 4, 2014.

Rao, S.; Chiao, J. Body Electric: Wireless Power Transfer for Implant Applications. IEEE Microwave Magazine 2015, 16, 54-64.

Reichenbach, S.E. and Geng, F. Two-dimensional cubic convolution. IEEE Transactions on Image Processing 2003, 12(8), pp. 857-865.

Rosenberg, J. EonR battery Recharging: Preliminary Findings of Three Prospective, Multi-centered, Post-market Studies, 24th Annual Meeting, 2008.

Shirsat, N.; Lyng, J.G.; Brunton, N.P.; McKenna, B. Ohmic Processing: Electrical Conductivities of Pork Cuts. Meat Science 2004, 67, 507-514.

(56) References Cited

OTHER PUBLICATIONS

Song, K.; Kim, J.; Cho, S.; Kim, N.; Jung, D.; Choo, H.; Lee, J. Flexible-Device Injector with a Microflap Array for Subcutaneously Implanting Flexible Medical Electronics. Advanced Healthcare Materials 2018, 7, 1800419.

Souvik Dubey; Chiao, J. Power Transfer for a Flexible Gastric Stimulator, IEEE BioWireless Conference, Austin, TX, Jan. 24-27, 2016.

Storer, J.E. Impedance of Thin-wire Loop Antennas. Transactions of the American Institute of Electrical Engineers. Part 1. Communication and electronics 1956, 75, 606-619.

Van der Sman, R. G. M Model for Electrical Conductivity of Muscle Meat During Ohmic Heating. Journal of Food Engineering 2017, 208, 37-47.

Viswanath, O.; Urits, I.; Bouley, E.; Peck, J.M.; Thompson, W.; Kaye, A.D. Evolving Spinal Cord Stimulation Technologies and Clinical Implications in Chronic Pain Management. Current Pain and Headache Reports 2019, 23, 1-6.

De Wachter, S.; Knowles, C.H.; Elterman, D.S.; Kennelly, M.J.; Lehur, P.A.; Matzel, K.E.; Engelberg, S.; Van Kerrebroeck, P. E. V New Technologies and Applications in Sacral Neuromodulation: An Update. Advances in Therapy 2020, 37, 637-643.

Yang, X.; Fu, T.; Kota, P.K.; Tjia, M.; Nguyen, C.M.; Chiao, J. Lactate Sensors on Flexible Substrates. Biosensors (Basel) 2016, 6, 48.

Andreuccetti, D. et al. An internet Resource for the Calculation of the Dielectric Properties of Body Tissues in the Frequency Range 10 Hz-100 GHZ, Institute of Applied Physics "Nello Carrara" (IFAC), CNR, 1997. Available: http://niremf.ifac.cnr.it/tissprop/.

\* cited by examiner

RESONANT COUPLER SYSTEMS AND METHODS FOR IMPLANTS

CROSS-REFERENCE TO RELATED APPLICATIONS

This application claims priority based on U.S. Provisional Application No. 63/213,583, filed Jun. 22, 2021. The contents of which is incorporated by reference in its entirety.

STATEMENT OF FEDERALLY FUNDED RESEARCH

None.

TECHNICAL FIELD OF THE INVENTION

The present invention relates in general to resonant coupler systems and methods. In particular, the present invention relates to the resonant coupler systems and methods for implant devices and associated devices.

BACKGROUND OF THE INVENTION

Modern electronic implants have advanced functions and reduced sizes significantly by integration of low-power electronics. Targeting better management of chronic diseases, sensing, recording, and electrical stimulation have been considered to be incorporated into a single device, which will require signal and data communication, remote control, and battery charging capabilities. Furthermore, battery size and capacity can be greatly reduced by efficient wireless charging, or the battery can be completely eliminated with wireless powering. With supercapacitors instead of a battery [1] [2], electric circuits and electrodes can be made on a flexible substrate and packaged with lamination. This opens a new class of implants that can be sufficiently thin and flexible to be implemented subcutaneously or interstitially for electrical and electrochemical sensing or stimulation [3]-[7].

Conventional wireless power transfer methods for implants utilize coils for inductive coupling [8]-[13]. It has been implemented for the charging function in several FDA-approved neurostimulators. Some have been in clinical studies. Commercially available ones have been compared on their efficacies and costs in practical uses [14]-[21]. Coil antennas utilizing magnetic field coupling to generate electric currents, as compared to antennas based on electric field coupling, can provide higher transfer powers. Electric field coupling antennas are constrained in designs by their dimensions in scales of the wavelengths at their operating frequencies. Magnetic coupling with a sufficiently high mutual inductance, typically achieved by large self-inductance with high turn numbers of coils, can achieve good power coupling without the limitation related to wavelength. In pacemakers or neuro-stimulators, the cross-section of coils is kept limited in order to keep the implants compact so that the incision for implantation procedures can be small to prevent patients from unnecessary pain. Typical stimulators have volumes of 14-40 cm$^3$ [22]. The smallest FDA-approved one with a conventional shape has a 47.2×57.1 mm cross-section, so the coil cross section is then limited to it [14] [23]. The coil antenna can be larger for the external handheld device, acting as a reader and power transmitter. However, its dimensions are still limited by operation convenience as the patient has to hold it by hand against the chest or waist to charge the implant for tens of minutes or even a few hours.

Typically, wireless power charging at the resonant frequency provides better efficiency. A wound-wire solenoid with a known self-inductance is matched with a tuning capacitor to achieve resonance at the desired operating frequency. Often, the inductance is determined empirically. Communication can be conducted through the same coils because the data rate for vital sign information and control command is usually low. Such solenoid coils intrinsically are bulky due to winding wires and its 3-D architecture. The operation is limited to lower frequencies along with low quality factors, not to mention it does not allow planar or monolithic configurations of implants.

As the power transfer occurs in the near-field range, the coupling coefficient and mutual inductance vary the loading impedance to the implant coil, creating an impedance mismatch for the circuit of the entire system. This affects the transmission and reflection coefficients in the implant and transmitter sides. Although dynamic tuning can adjust the reader/transmitter for better impedance matching, it is not preferred to have automatic or manual tuning in the implant in order to avoid additional circuit complexity or size increases. This is particularly critical for planar subcutaneous or interstitial implants.

Furthermore, with the trend that implant sizes are getting smaller and future im$_{77}$plants are moving toward planar configurations, a quick and convenient way to identify the device location inside the body is needed, especially for subcutaneous implants. The conventional way of X-ray computed tomography [24] [25] takes time, adds more costs, and exposes patients to additional risks since it is by ionizing radiation.

For subcutaneous and interstitial implants, the thickness of the device package should be as thin as possible. For example, subcutaneous electrodes are implemented for electrical stimulation of peripheral nerves to inhibit chronic pain [5]. It demonstrated substantially reduced procedural risk and improved quality of life by reducing pain without analgesia; however, the wired connection presented practicality issues for long-term uses. A permanent subcutaneous implant with wireless control and power will resolve the usability issue to optimize pain management benefits. Another example is a foldable gastrostimulator fabricated on a polyimide substrate that can be folded into a cylinder shape and inserted into a tube delivered by an endoscope 89 into the stomach via mouth and esophagus [3]. The device is then unfolded back to its planar shape and inserted into the stomach's submucosal layer as a secure attachment method. The gastrostimulator delivers electrical pulses into the mucosal and submucosal layers of the stomach to modulate its motility. These devices are based on flexible biocompatible polyimide substrates, and planar spiral antennas are utilized for inductive coupling [7]. In such cases, the turn numbers are limited due to the substrate size. As an effort to increase self-inductance, reduction of metal line width in order to increase total metal line length inevitably increases AC resistance of the coil and reduces the operating frequency. Furthermore, the effective permittivity experienced by the antenna changes with the implant depth. Impedance matching becomes challenging because the circuits need to provide a wide range of tuning capacitances to minimize reflection losses at different implant depths under the skin.

In this work, considering the practical constraints of implantation, such as surgical procedures and patient uses, we investigate the designs of planar loop antennas for subcutaneous implants. Loop antennas without substrates were analytically studied by Storer [26] and recently by McKinley et al. [27] for their real and imaginary parts of port impedances, resonances, and equivalent resonant circuits. For a single loop with a radius of b, the loop length $2\pi b$ roughly determines the harmonic resonant frequencies. However resonant wavelengths $\lambda_m$ are not exactly $\lambda_m = 2\pi b/m$ due to impedance variations around the resonant points in which the current distributions on the metal are affected by fields, where m is an integer, as one would have expected. To address such issues, a unit-less measure $\Omega = 2\ln(2\pi b/a)$, where a is the half of the loop metal line width w, defines resonance quality factors at respective resonant frequencies [27]. When $\Omega = 12$ the resonant frequencies are at $2\pi b/\lambda = 1.069$, 2.099, 3.123 and 4.144 for the first four (instead of m=1, 2, 3, 4) resonance points, at which the imaginary parts of the impedances become zero or near zero while the real parts of those do not reach maximum despite not being the minimum [26, 27]. At such resonance points, current flows with low voltage establish in-phase standing waves suitable for energy transfer. At the respective "anti-resonant" points, defined in [27], when the imaginary part of impedance also becomes zero while its real part reaches local maximum, little current flows in the metal loop, making it unsuitable for magnetic field coupling. At higher resonant points, typically above the third resonance, the quality factors decrease significantly as the resonant and anti-resonant points become closer in frequencies.

In general, when $\Omega<9$ (or $b/a<14.3$), the resonances of a single loop become insignificant as the reflection coefficient is not sufficiently low to deliver power into the antenna from the circuitry. Thus, for an ideal case, b should be large. However, the loop radius b is roughly pre-determined by the International Telecommunication Union (ITU) allowed operating frequencies, such as the ones in the industrial, scientific and medical (ISM) bands at 903 MHz or 2.45 GHz. Therefore, b cannot be as large as one might wish. Increasing $\Omega$ by decreasing a faces fabrication challenges. The higher AC resistance in a narrower metal line also increases power dissipation and thus reduces the loop quality factor. These limitations have restricted the use of planar loop antennas for implants.

SUMMARY OF THE INVENTION

In one embodiment, the present invention includes a planar inductive resonant coupler including: a planar loop antenna; and an element disposed within and co-planar with a loop formed by the antenna; wherein one or more antenna or element dimensions are sized to tune a coupler resonance of the coupler. In one aspect, the element is a pad element. In another aspect, the element is a loop element. In another aspect, the antenna and the element are circular, elliptical, square-shaped, rectangle-shaped, or polygon-shaped. In another aspect, the element includes a metal. In another aspect, the one or more antenna or element dimensions include an antenna inner diameter of the antenna, an antenna outer diameter of the antenna, and an element diameter of the element. In another aspect, the planar inductive resonant coupler further includes a coupler substrate on which the antenna and the element are disposed. In another aspect, the planar inductive resonant coupler further includes an attachment interface on which the antenna and the element are disposed and adapted to attach the coupler to an implant device or a wearable device. In another aspect, the one or more antenna or element dimensions are sized to tune the coupler resonance by forming a selected gap width between a circumference of the element and an inner circumference of the loop. In another aspect, the coupler resonance is tuned to maximize a quality factor of the coupler for a selected coupler resonance frequency. In another aspect, the antenna and the element are adapted to be coupled to circuitry, to receive or to transmit electromagnetic energy to or from a surrounding environment, and to transmit the electromagnetic energy to the circuitry. In another aspect, the surrounding environment includes an electromagnetic power source, an electromagnetic power coupler, an electromagnetic data transmitter, or an electromagnetic data receiver, or some combination. In another aspect, the circuitry includes a sensor, a stimulator, an energy storage device, or some combination.

In another embodiment, the present invention includes a method of making a planar inductive resonant coupler, the method including: sizing one or more dimensions of a circular planar loop antenna and an element, wherein the element is adapted to be disposed within and coplanar with a loop formed by the antenna; and disposing the element within the loop to form a gap between the loop and the element. In one aspect, the element is a pad element. In another aspect, the element is a loop element, In another aspect, the antenna and the element are circular, elliptical, square-shaped, rectangle-shaped, or polygon-shaped. In another aspect, the element includes a metal. In another aspect, the one or more dimensions of the circular planar loop antenna and the element include an antenna inner diameter of the antenna, an antenna outer diameter of the antenna, and an element diameter of the element. In another aspect, the method of making a planar inductive resonant coupler further includes disposing the antenna and the element on a substrate. In another aspect, the method of making a planar inductive resonant coupler further includes disposing the antenna and the element on an attachment interface adapted to attach the coupler to an implant device or a wearable device. In another aspect, the method of making a planar inductive resonant coupler further includes forming a selected gap width between a circumference of the element and an inner circumference of the loop. In another aspect, the method of making a planar inductive resonant coupler further includes tuning a coupler resonance to maximize a quality factor of the coupler for a selected coupler resonance frequency.

In another embodiment, the present invention includes a method of using a tuned planar inductive resonant coupler, the method including: providing a coupler including: a circular planar loop antenna; and an element disposed within and co-planar with a loop formed by the antenna; wherein one or more antenna or element dimensions are sized to tune a coupler resonance of the coupler; disposing the coupler in an implant device or a wearable device; and sending electromagnetic energy to the coupler from an electromagnetic energy source or a data transmitter in a surrounding environment of the coupler, or receiving electromagnetic energy from the coupler with an electromagnetic power coupler or a data receiver in the surrounding environment of the coupler. In one aspect, the method of using a tuned planar inductive resonant coupler further includes disposing the coupler on a substrate. In another aspect, the method of using a tuned planar inductive resonant coupler further includes disposing the coupler on an attachment interface adapted to attach the coupler to an implant device or a wearable device.

In another embodiment, the present invention includes a method of locating a subcutaneous planar inductive resonant coupler including: providing a subcutaneous planar inductive resonant coupler including a circular planar loop antenna; and an element disposed within and co-planar with a loop formed by the antenna; wherein one or more antenna or element dimensions are sized to tune a coupler resonance of the coupler; providing a locating device configured to couple with the subcutaneous planar inductive resonant coupler; placing the locating device within a coupling range of the subcutaneous planar inductive resonant coupler; plotting a location for each of one or more resonant frequencies of the locating device with respect to a surface under which the subcutaneous planar inductive resonant coupler is expected to be located; and identifying a location for a specific resonant frequency of the subcutaneous planar inductive resonant coupler on the surface. In one aspect, the locating device comprises an electromagnetic power source, an electromagnetic power coupler, an electromagnetic data transmitter, an electromagnetic data receiver, or some combination.

BRIEF DESCRIPTION OF THE DRAWINGS

For a more complete understanding of the features and advantages of the present invention, reference is now made to the detailed description of the invention along with the accompanying figures, in which:

FIG. 14A shows a localization map at the orientation that ports are aligned, and FIG. 14B shows a localization map at a rotated orientation of port by 90° from the cases shown in FIG. 14A.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

An embodiment of the present invention includes a modified loop antenna structure for near-field power transfer and data communication, given the aforementioned limitations. The antenna is based on a simple planar loop, of which spectral characteristics can be calculated by the analytical forms in [27], with a metal element embedded for tuning purposes. The center element behaves as distributed reactive tuning elements contributing shunt capacitances and mutual inductances to the impedance of the loop and matching the port impedance at the desired resonant frequency. In various embodiments, the element is a loop element or a pad element. References to a pad herein are merely exemplary and encompass both a pad element and a loop element. Further, in various embodiments, the antenna and the element are circular, elliptical, square-shaped, rectangle-shaped, polygon-shaped, or they other shapes.

Figure 1A:
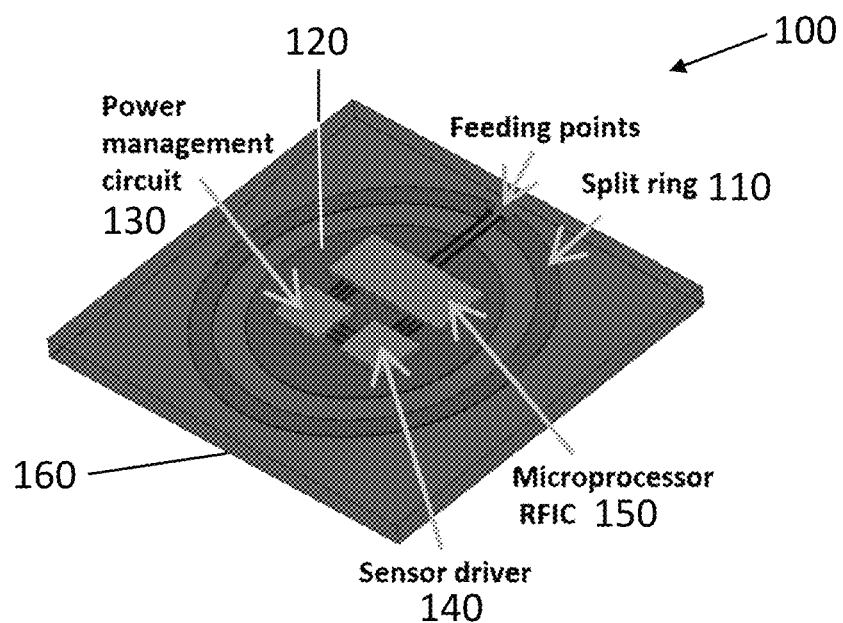
FIG. 1A shows a resonate coupler device architecture.

The center element also serves as the space to accommodate circuits making the implant compact, as shown in FIG. 1A. We focus on demonstrating the design strategy for impedance matching with two antennas at 903 MHz of the first resonance and at 2.45 GHz of the second resonance. The impedance matching performance at different implantation depths under the skin is studied. The discrepancies due to the differences of dielectric properties in the documented human skins and phantoms made of ground pork are investigated. The resonant antenna can also serve as a beacon for locating the implant noninvasively by a scanner placed on the skin. The capability and resolution are examined.

In FIG. 1A, an embodiment of the present invention is shown, a planar inductive resonant coupler 100 including a circular planar loop antenna 110 (also referred to herein as a split ring antenna), an element 120 (also referred to herein as a center element), and various exemplary items of circuitry including a power management circuit 130, a sensor driver 140, and a microprocessor radio-frequency integrated circuit (RFIC) 150; and a coupler substrate 160 (also referred to as a substrate 160 herein) on which the antenna 110 and the element 120 may be disposed. The antenna 110, the element 120, or both include metal or some other conductive material in embodiments of the present invention; references herein to a metal antenna or a metal element are exemplary. The pad element shown in FIG. 1A and in any other figure and discussed herein is exemplary of pad and loop elements of various embodiments and is not limiting. Further circular shapes shown in FIG. 1A and in any other figure and discussed herein is exemplary of antenna and element shapes of various embodiments and are not limiting.

Figure 1B:
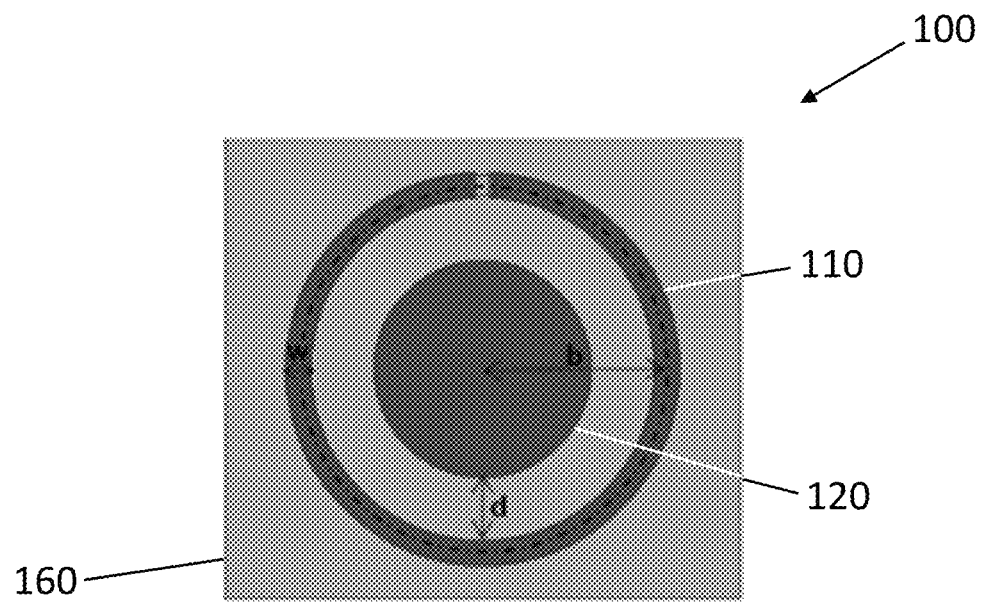
FIG. 1B shows dimensions of a resonate coupler device.

The resonator consists of a split ring and a center element, shown in FIG. 1B The center element adds distributed capacitances, as electric fields are established across the gap between metal patterns along the loop. The element decreases self-inductance in the loop, as the induced currents on the center element produce opposite-polarization magnetic fields in the gap. The spacing d between the metal loop and the element tunes the distributed reactive elements, and the resultant impedance affects the reflection coefficient $s_{11}$ at the driving port. An embodiment of the present invention shown in FIG. 1B includes the coupler 100, including an antenna 110 with an element 120, disposed on a coupler substrate 160. Dimensions are shown in FIG. 1B, including w, a width of the split ring; b, a distance between the center axis of the element and the circle halfway between the antenna inner diameter and the outer antenna diameter; and d, the width of the gap between the diameter of the element and the antenna inner diameter. Two designs are conducted for the ISM bands of 902-928 MHz and 2.4-2.5 GHz. For the operating frequency at 903 MHz, b=13.15 mm and w=2a=1.8 mm. The design has b=8.9 mm and 2a=1.16 mm for the carrier frequency of 2.45 GHz. In both cases, $\Omega$ is kept at 9, which gives reasonable fabrication tolerance for us to compare measurements and theory.

Figure 2A:
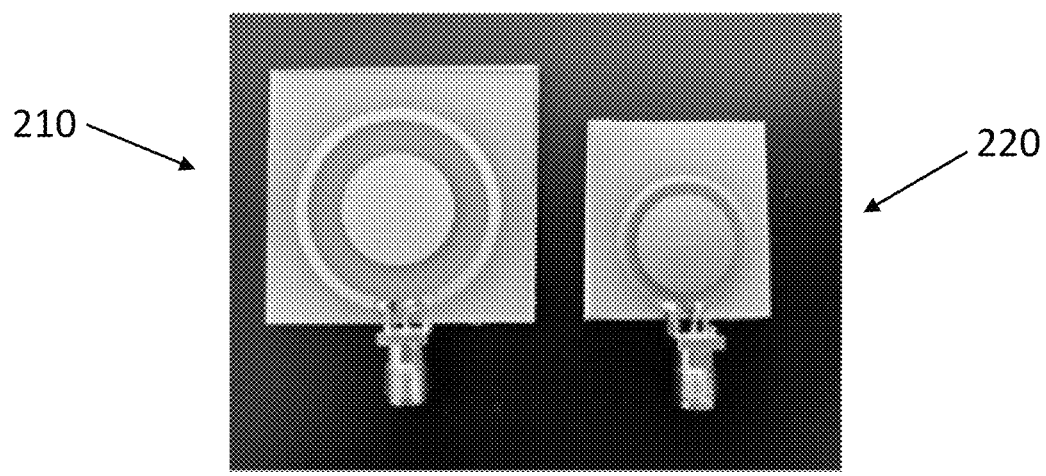
FIG. 2A shows a photograph of tuned resonate couplers with center pads.
Figure 2B:
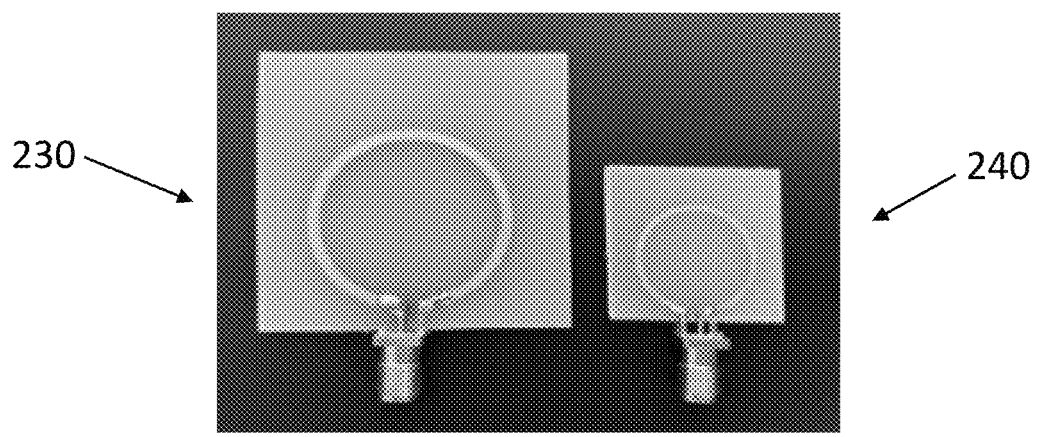
FIG. 2B shows prior art antennas without pads.

The test articles are shown in photographs in FIG. 2A: the test article 210 for 903 MHz and the test article 220 for 2.45 GHz. FIG. 2B shows prior art antennas without elements.

Figure 3A:
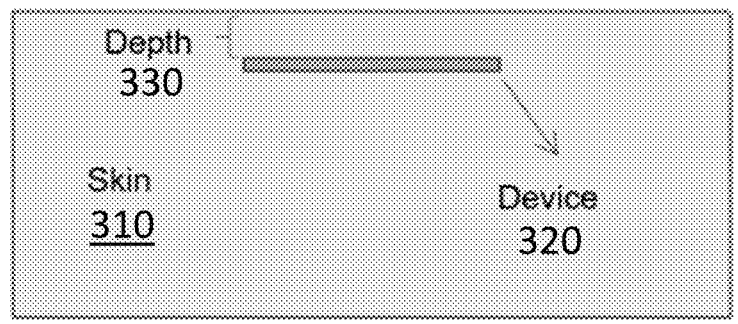
FIG. 3A shows a simulation configuration.
Figure 3B:
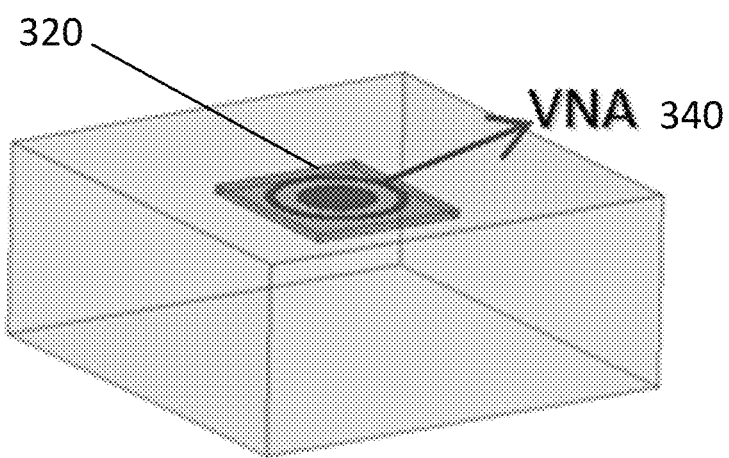
FIG. 3B shows a measurement configuration.

The antennas are fabricated on single-layer FR4 substrates, which have a dielectric constant of 4.4 and a thickness of 1.5 mm. A 50-$\Omega$ sub-miniature version A (SMA) adaptor connects the antenna to a vector network analyzer (VNA), as shown in FIGS. 3A and 3B. For finite-element simulations, the material permittivities for human skins are obtained from [29]. The permittivities and conductivities are frequency dependent. At 903 MHz, the relative permittivity and conductivity are 46.068 and 0.845 S/m, and at 2.45 GHz, 42.853 and 1.5919 S/m, respectively. The simulation configuration is shown in FIGS. 3A and 3B, with FIG. 3A showing skin 310 and the coupler 320 at a depth 330 in the skin 310, and FIG. 3B showing the coupler 320 connected to a VNA 340. The device is inserted into the skin with a variable depth. The design targets an implant depth of 6 mm at which the resonance occurs at 903 MHz or 2.45 GHz.

In measurements, the device is connected to a vector network analyzer (Keysight PNA N5227B). Ground pork with about 27% of fat and 0.013 moles of salt in deionized water is used at room temperature as the phantom. The pork is packed in a cube of 100×100×50 cm$^3$ and sealed with multiple layers of plastic wrap to keep moist with saline. As it is impossible to use human tissues for such experiments, certain disagreements on permittivity and conductivity are expected. Verification for the experiments is discussed below. Both the simulations and measurements are conducted up to 3 GHz, covering the two desired ISM bands for both the loop antennas with and without the center element.

Figure 4:
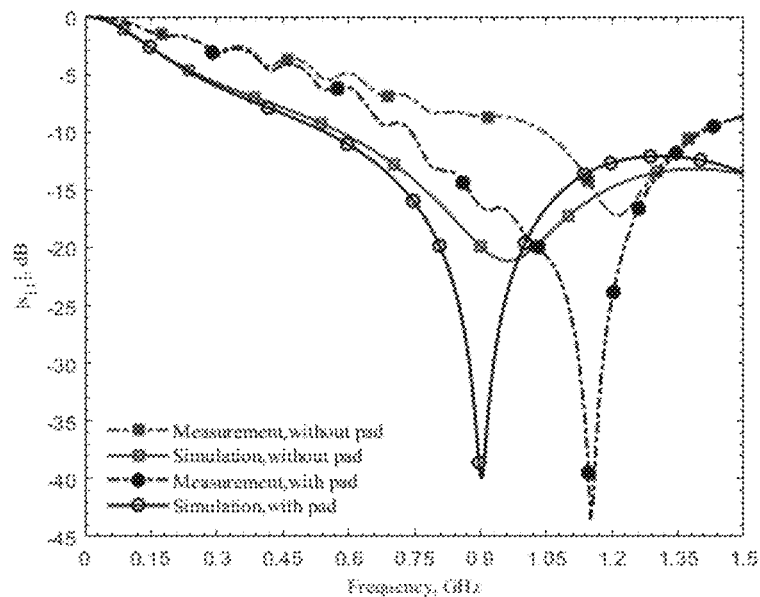
FIG. 4 shows simulation and measurement results of the resonate coupler for the ISM frequency band 902-928 MHz with and without the center pad.

FIG. 4 shows the reflection coefficients for the 903-MHz antennas with and without the element when the implant is in a depth of 6 mm. Both simulation and measured results (blue curves) indicate better resonance, respectively, at 903 MHz and 1.152 GHz for the device with a center element. The gap d, in this case, is 4.5 mm. The case without the center element has its resonance at 960 MHz in simulation, although the loop is designed for 903 MHz according to the analytical equations [27]. This is due to the effective dielectric constant change around the antenna resulting from its implantation depth. The measured result shows a resonant frequency of 1.209 GHz. As expected, the permittivity of tissues and the depth change the resonant frequency. There is a 0.249-GHz frequency shift between simulation and measurement (dashed line). Both the cases with and without the center element have the same frequency shifts. This is due to the dielectric constant differences between human skin (simulation) and ground pork (experiment). This disagreement will be confirmed later. Comparing the measurements for the antennas with and without the center element, they clearly indicate a significant improvement in resonance with reflection coefficients from −17 to −43.5 dB. The figure data labels (squares and circles) are used to distinguish the curves. They are not the data points. Simulations are obtained with 801 points while measurements contain 1001 points. This applies to all the comparison figures herein. Comparing the measurement results with and without the center element, they clearly indicate that the improvement in resonance with a reflection coefficient from −17 to −43.54 dB using the test article of the embodiments of the present invention.

Figure 5:
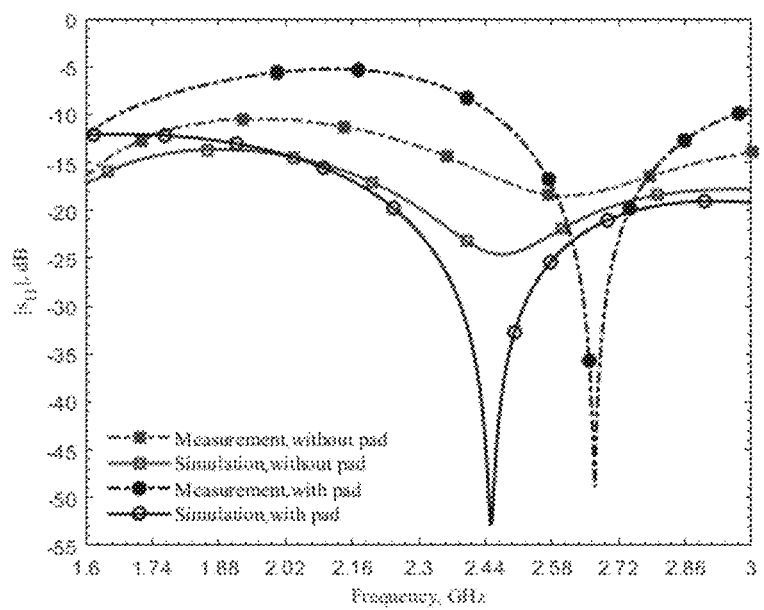
FIG. 5 shows simulation and measurement results for the ISM frequency band 2.4-2.5 GHz with and without the center pad.

FIG. 5 shows the simulated and measured return losses for the resonating antennas with and without the element for the 2.4-2.5 GHz frequency band. The design targets the second resonance to be at 2.45 GHz. The element gap d is 1.5 mm. Similarly, the measured $|s_{11}|$ is improved from −18.5 to −48.9 dB. A frequency shift of 0.219 GHz between simulation and measurement for the cases with the element is also observed. Although the case without the element design shows a resonance null, its measurement indicates a much less noticeable resonance due to the tissue permittivity. However, the cases with the element show clearly good impedance matching despite the pork tissue permittivity is different from that of skin. This highlights the need to have a robust resonance in the designs considering tissue property variations.

Figure 6:
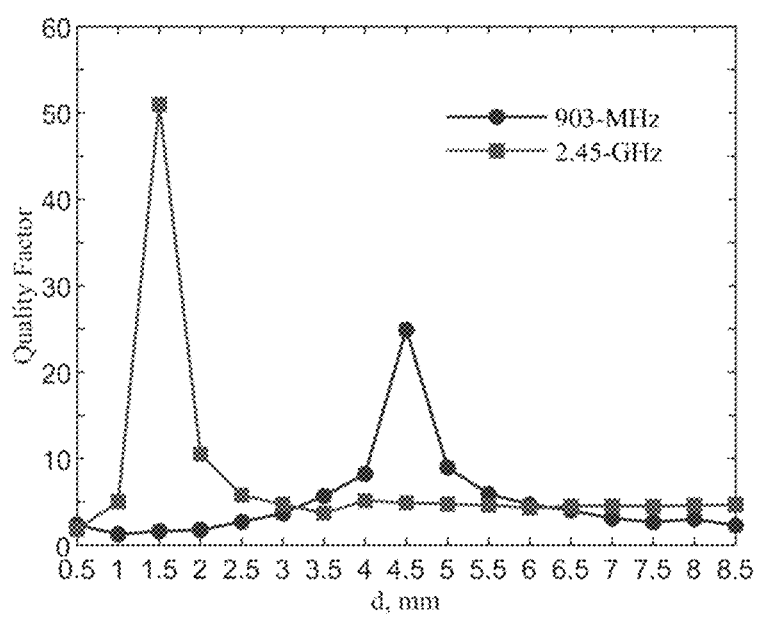
FIG. 6 shows quality factors of the tuned loop at the two ISM bands for the implant depth of 6 mm.

FIG. 6 shows the quality factor comparison for the designs in two ISM bands. The quality factor is calculated from $Q=f_0/\Delta f$ where $f_0$ is the resonant frequency and $\Delta f$ is the 3-dB bandwidth. The quality factors reach maximum values of 24.91 and 51 with d=4.5 and 1.5 mm for the 903-MHz and 2.45-GHz designs, as compared to those of 2.12 and 4.80 for their counterparts of single loop designs without an element.

Figure 7A:
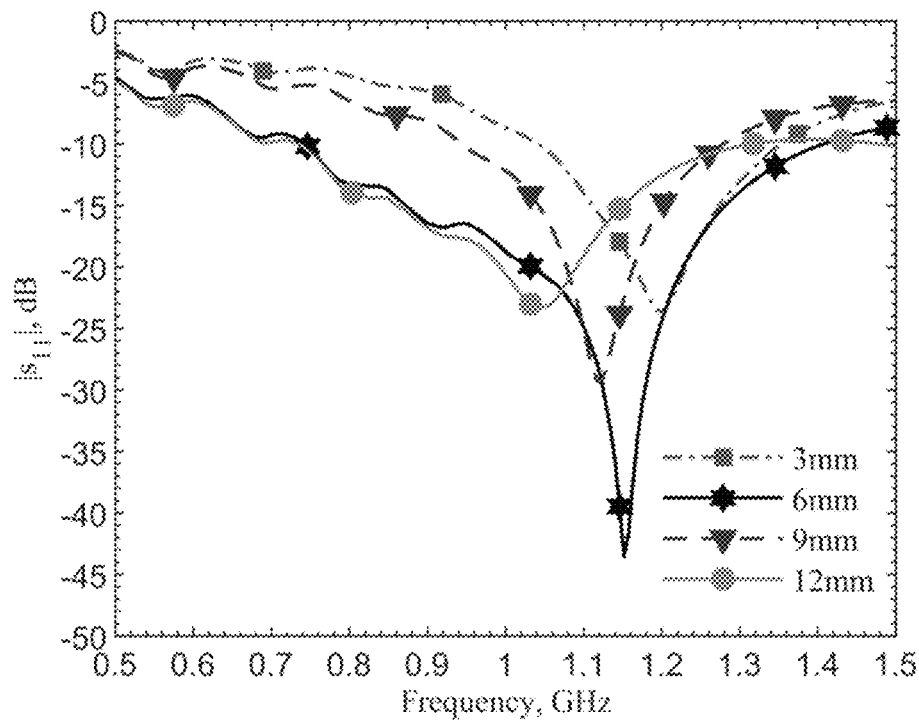
FIGS. 7A and 7B show simulations of the reflection coefficient for the 903-MHz (FIG. 7A) and 2.45-GHz (FIG. 7B) designs in the depths of 3, 6, 9 and 12 mm, where the simulations are conducted with human skin properties documented in [29].
Figure 7B:
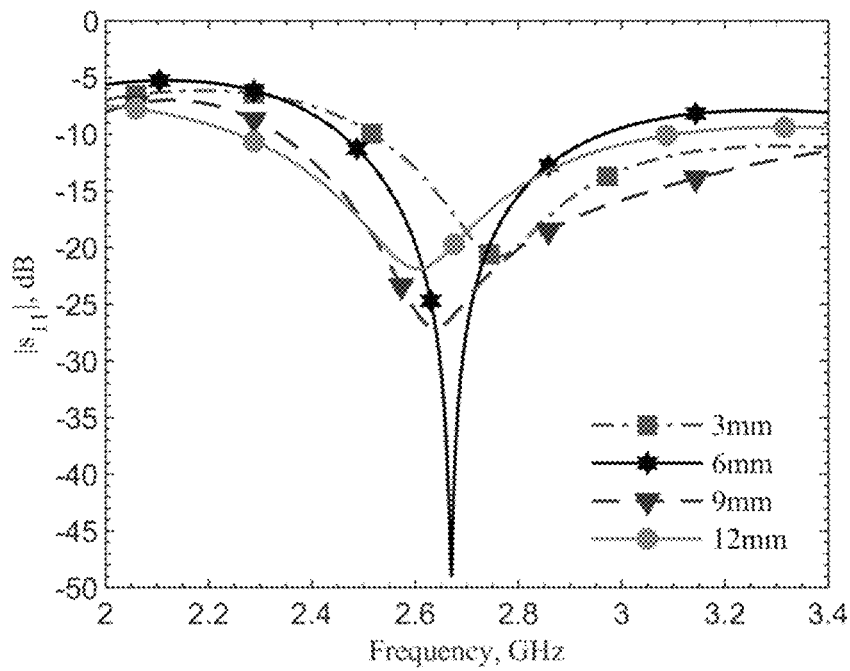

The implantation depth for these two ISM-frequency bands is designed at 6 mm. In realistic scenarios, surgeons may not have a way to control the depth so precisely. FIGS. 7A and 7B show the reflection coefficient changes at depths of 3, 6, 9, and 12 mm by simulations using human skin data, respectively, for the 903-MHz and 2.45-GHz designs. In both designs, the frequency shift percentages are within 6%, while the reflection coefficients and quality factors vary. The refection coefficients for all four cases are below −20 dB. In the cases without the tuning element, only the 6-mm cases have refection coefficients around −20 dB at the operating frequencies. This means the tuning element provides not only a better resonance at the operating frequency but also a more robust design against the depth variations.

Figure 8A:
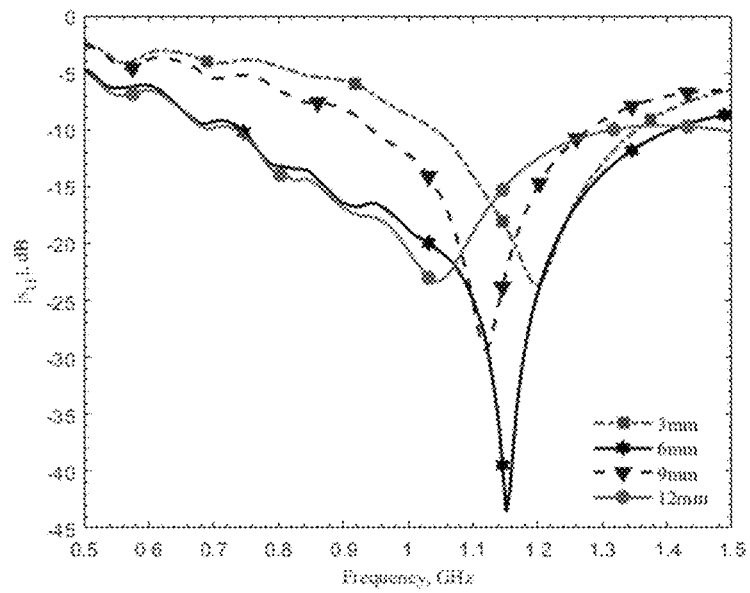
FIGS. 8A and 8B show measurements of the 903-MHz design (FIG. 8A) and the 2.45-GHz design (FIG. 8B) at depths of 3, 6, 9 and 12 mm in the ground pork phantom.
Figure 8B:
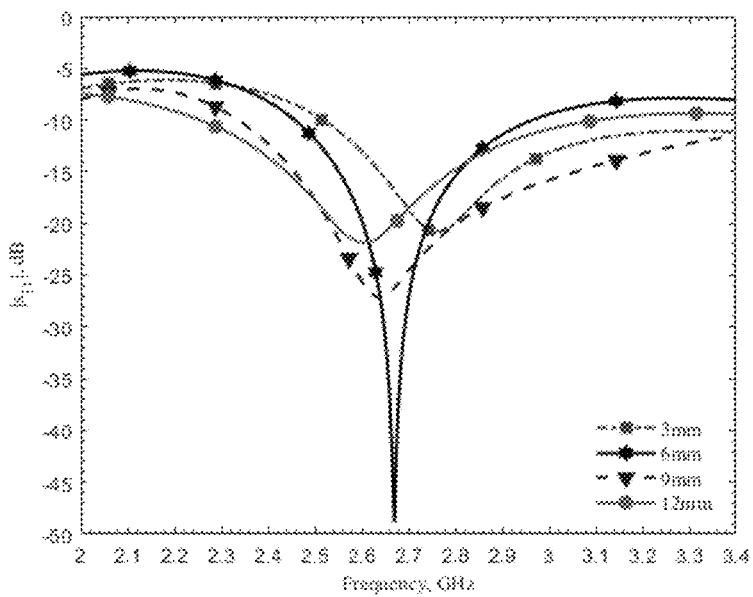

We conduct experiments at different depths of 3, 6, 9, and 12 mm. The devices are inserted into a certain depth of the ground pork phantom. It is difficult to precisely control the varying depth steps less than 3 mm. FIGS. 8A and 8B show the measured resonances for the designs at 903 MHz (FIG. 8A) and 2.45 GHz (FIG. 8B). They match well with the simulations. Due to the permittivity of ground pork used, the measured resonant frequencies remain to have frequency shifts from the respective theoretical values utilizing the documented human skin permittivities. At the desired depth of 6 mm, the resonances are at 1.152 GHz and 2.67 GHz, respectively. Both plots show the same frequency shift trends at different depths. This is expected as the effective permittivity experienced by the antenna, which is affected by the field distribution proportions in air and inside tissues, changes resonance. The reflection coefficients are better than −20 dB in all cases.

Figure 9A:
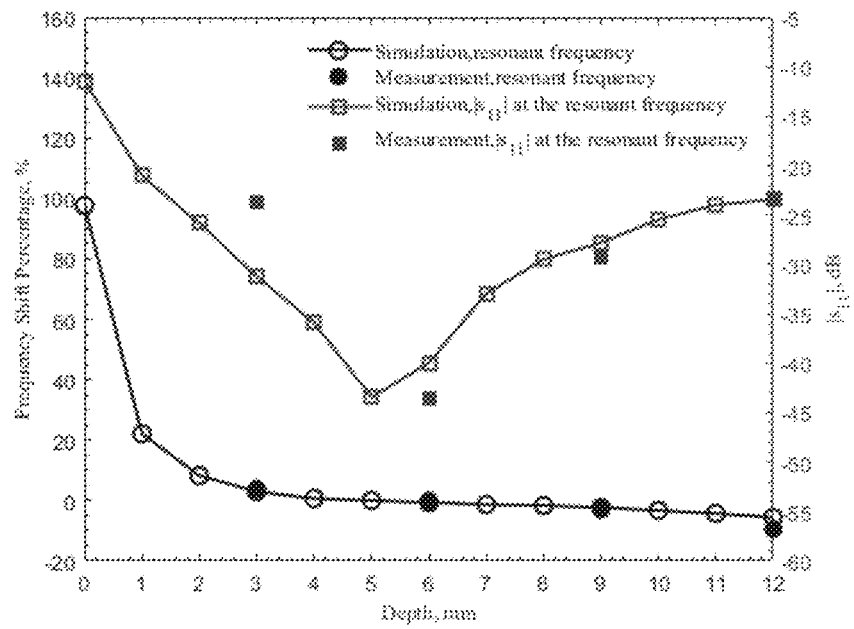
FIGS. 9A and 9B show frequency shift percentage (left y-axis) and $s_{11}$ magnitude (right y-axis) in the depth of 0-12 mm for the 903-MHz (FIG. 9A) and 2.45-GHz (FIG. 9B) designs, where measurements in discrete depths of 3, 6, 9, 12 mm are compared with simulation results obtained at 1-mm steps.
Figure 9B:
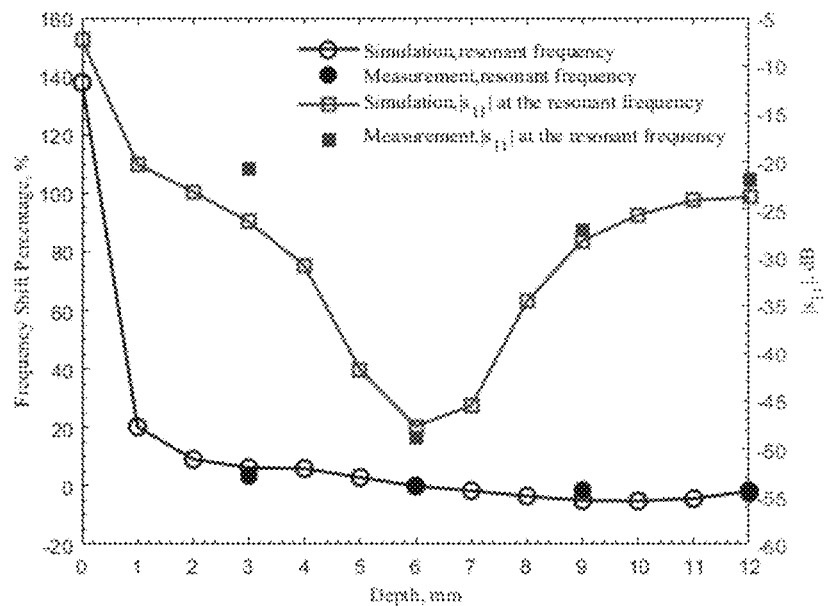

With the 6-mm depth designs for the resonant frequencies at 903 MHz and 2.45 GHz as the reference points and utilizing the documented frequency-dependent human skin permittivities and conductivities [29], simulations are conducted for various depths at a 1-mm step up to 12 mm. The resonant frequency shifts and reflection coefficients are shown in FIGS. 9A (903 MHz) and 9B (2.45 GHz). The measured results in FIGS. 9A and 9B are extracted, but with their resonances at 1.152 and 2.67 GHz, for the 6-mm depth, as the reference points. The measured resonant frequency shifts and return losses at the four discrete points of 3, 6, 9, and 12 mm match the theoretical results. For the depth of 3 mm, the frequency shifts match well, while the $|s_{11}|$ has 7 and 5 dB discrepancies for 903-MHz and 2.45-GHz, respectively. Again, this is due to the differences of permittivities and conductivities in human skin dataset and ground pork. It should also be noted that the documented human skin permittivity data was obtained by measurements on skin, in which it combines all electromagnetic-wave effects from epidermis, dermis and fat layers as well as blood vessels and glands. The pork phantom is constructed with quasi-uniformly mixed fat and muscle tissues without layers. Thus, some differences between simulation and measurement are expected.

In conclusion, to maintain resonant frequency shifts less than 5% from the designed operating frequency, the implant depth should be deeper than 3 mm. Additionally, even if the transmitter can be dynamically tuned to reach the best resonance at the designed operating frequency, the implant depth should be kept between 4 and 8.5 mm to satisfy the requirement of reflection coefficient for the implant circuitry lower than −30 dB. If the requirement is at −20 dB, the implant depth can be at 2 mm to 12 mm.

There are disagreements between measurements and simulations due to the use of moist ground pork as phantom to mimic human tissues. The electrical parameters in simulations are obtained from [29]. For both 903-MHz and 2.45-GHz designs with/without the center element and at different implant depths, the frequency shifts between the theory and measurement are similar at 0.249 and 0.219 GHz, respectively.

Figure 10:
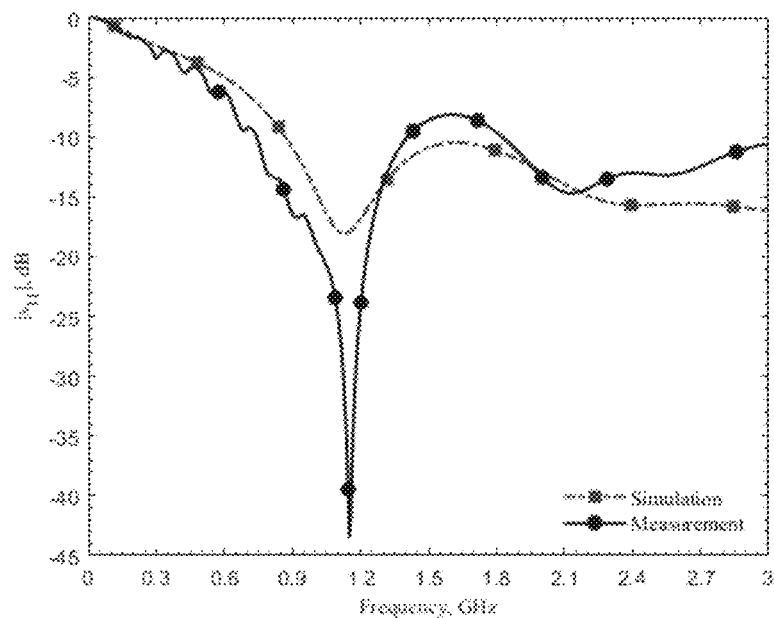
FIG. 10 shows simulations showing frequency matching after a relative permittivity decrease of 25 and a conductivity decrease of 0.35 S/m.

We changed the permittivities and conductivities in the simulations to investigate the effects. With the human skin data from DC to 3 GHz as the base, uniform reductions on the relative permittivities and conductivity for all frequencies are used in a new phantom model to compare with the ground pork phantom. The rationale is that the pork contains more fat than human skin, so the permittivities should be lower at the frequencies of interest [30]-[32]. The pork does not contain interstitial fluid flows, so the conductivity should also be lower [33] [34]. For a relative permittivity decrease of 25 and a conductivity decrease of 0.35 S/m in the simulation, the result matches with the measurement at 1.152 GHz, as shown in FIG. 10.

Figure 11:
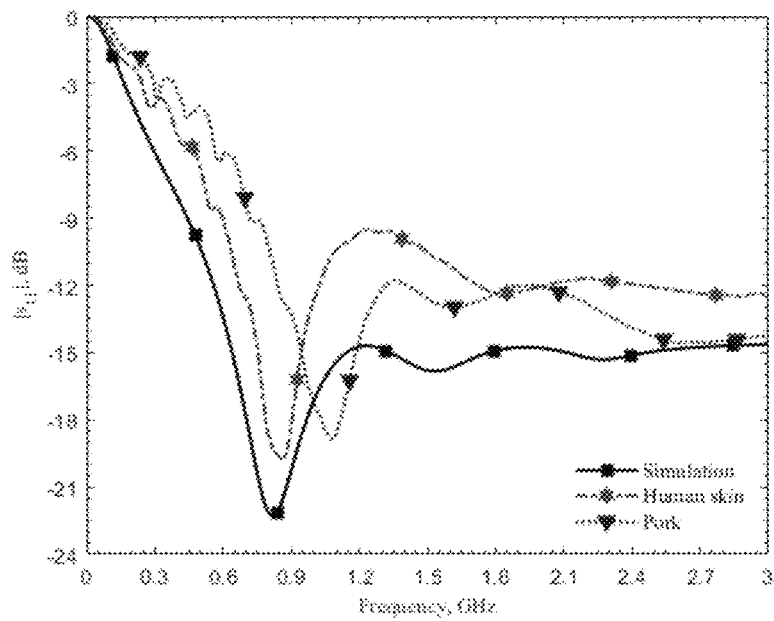
FIG. 11 shows a comparison of simulation utilizing the documented frequency-dependent human skin electrical properties, measurement on top of a person's forearm skin, and measurement on the top surface of the ground pork cube.

For further validation, we compare the scenario at the zero depth, by which the antenna is directly in contact with the skin. FIG. 11 shows the results of the simulation utilizing the human skin electrical properties (black curve), measurement with the antenna placed on the skin of a person's forearm (red), and on the top surface of the ground pork cube (blue). The resonant frequency in the simulation is 0.82 GHz, which matches the measured 0.86 GHz on the arm's skin, while the resonant frequency is 1.08 GHz for the ground pork phantom. The frequency difference of 0.22 GHz between the human skin and pork also agrees with those in other depths. From these two validation results, the designs utilizing the human skin properties could work well in realistic scenarios.

In summary, an element as a tuning structure in the center of a loop (split ring) antenna improved the resonance condition for wireless power and data transfer. The metal element in the center can also serve as the space to accommodate electronics including microprocessor, power management and sensor driver. Exemplary designs were demonstrated at two ISM bands with first and second resonant frequencies, respectively. The resonance for inductive coupling and thus impedance matching for the circuitry of embodiments of the present invention were shown to be greatly improved under practical constraints for subcutaneous implants.

The changes in resonant frequency and return loss due to implant depth deviation that occurs in the practical scenarios were also investigated. The tolerance for implantation depth was examined. Acceptable resonant frequency shift and reflection coefficient for the implant circuitry of embodiments of the present invention were shown to inform the desired implant depths.

Embodiments of the present invention may include a resonant coupler disposed on an attachment interface adapted to attach the resonant couple to an implant or a wearable device. The coupler resonance may be tuned by sizing one or more antenna or element dimensions by forming a selected gap width between a circumference of the element and the inner circumference of the loop. The coupler resonance may be tuned to maximize a quality factor of the coupler for a selected coupler reference frequency.

In embodiments of the present invention, the antenna and the element of the coupler may be adapted to be coupled to circuitry, adapted to receive or transmit electromagnetic energy to or from a surrounding environment, and adapted to transmit the electromagnetic energy to the circuitry. The circuitry may include a sensor, a stimulator, an energy storage device, or some combination. The surrounding environment may include an electromagnetic power source, and electromagnetic data transmitter, or an electromagnetic data receiver, or some combination.

An embodiment of a method of making a planar inductive resonant coupler may include sizing one or more dimensions of a circular planar loop antenna and an element, wherein the element is adapted to be disposed within and coplanar with a loop formed by the antenna; and disposing the element within the loop to form the gap.

An embodiment of a method for using a planar inductive resonant coupler may include providing a coupler including a circular planar loop antenna; and an element disposed within and co-planar with a loop formed by the antenna; wherein one or more antenna or element dimensions are sized to tune a coupler resonance of the coupler; disposing the coupler in an implant device or a wearable device; and sending electromagnetic energy to the coupler from an electromagnetic energy source or a data transmitter in a surrounding environment of the coupler, or receiving electromagnetic energy from the coupler with an electromagnetic power coupler or a data receiver in the surrounding environment of the coupler.

For subcutaneous or interstitial implants, the devices become invisible after the incision heals. With advances of biocompatible materials and technologies, they will become thinner, smaller, and will be able to be delivered by an injector that leaves a minimal scar [35]-[37], making it challenging to locate the implant sites without using sophisticated instruments such as X-ray computed tomography [38]. It is particularly important if the patients who have such implants are unconscious or in an emergency room setting.

Figure 12:
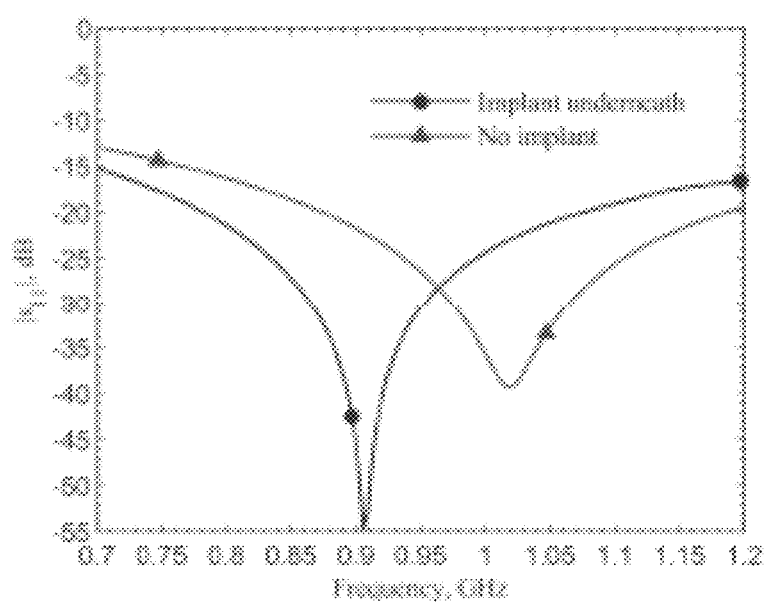
FIG. 12 shows a comparison of $s_{11}$ magnitude between the cases with and without implant underneath the skin.

Owing to the resonance between the implant antenna and transmitter, it can be utilized in a continuous or discrete raster scan method to identify the implant. The implant antenna is tuned to resonance at the 6-mm depth with a reflection coefficient of −58.85 dB at 906 MHz. The transmitter is then tuned to work with this implant. Shown in FIG. 12, its reflection coefficient at 906 MHz is −54.65 dB. When there is no implant underneath, the resonant frequency at the transmitter becomes 1.02 GHz with a reflection coefficient of −39.27 dB.

A discrete raster scan is conducted to validate the noninvasive localization concept. The implant is at a depth of 6 mm while the transmitter is placed on the skin. A 2-D map of the resonant frequencies can indicate the implant location. When the two tuned loop antennas align center-to-center, it is set as the origin point (x, y)=(0, 0). Each pixel is 10×10 mm$^2$. The total scanning area is 110×110 mm$^2$ with a resolution of 11×11 pixels.

Figure 13A:
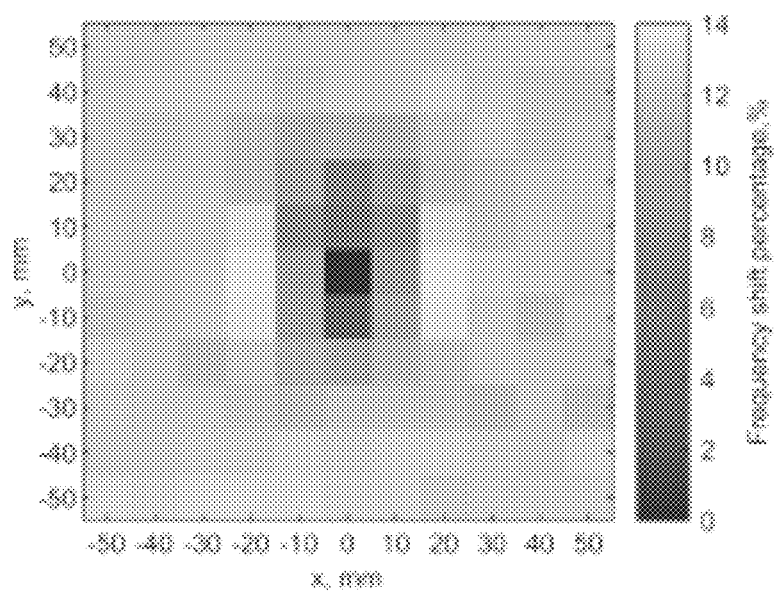
FIG. 13A shows a localization result from measurements with the implant in a depth=6 mm, and with the implant located in (x=0, y=0). The dark blue color pixel indicates the implant location.

FIG. 13A shows the scanning results. The color scales show the resonant frequency shifts from the designed one. It clearly shows the location of the implant antenna at (0, 0), where the resonant frequency of the transmitter is 906 MHz. Adjacent pixels (0, 10) (0, −10) have 960 and 940 MHz on the y-axis, respectively. At the edges of the map, its resonant frequencies are around 1.02 GHz.

For the fundamental mode of resonance, the magnitudes of current distribution on the loop have maximums at the port and in the middle of the loop length while minimums at the first and third quarters of the loop circumference. This creates an asymmetry in radiating field distributions. Even when the two loops align center-to-center, if the port orientations are different, the field coupling becomes different, and it effectively changes the resonance.

Figure 13B:
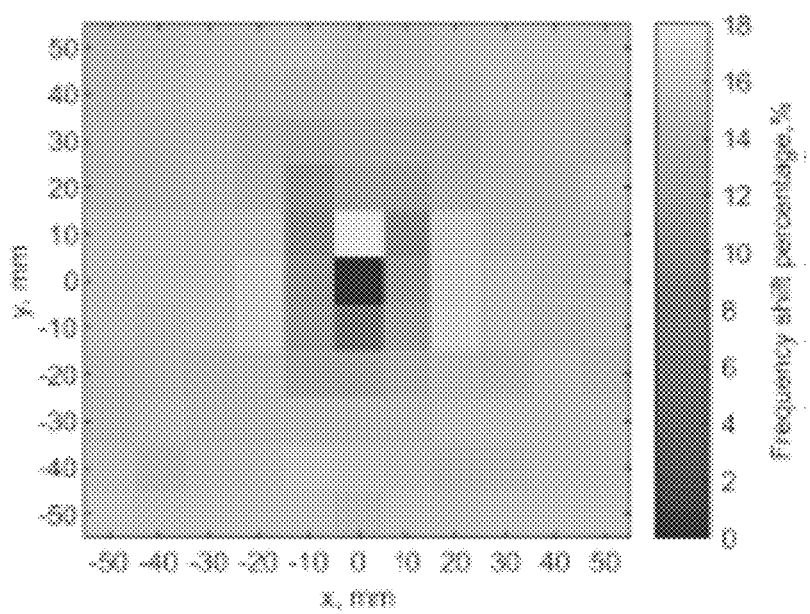
FIG. 13B shows a localization map with the transmitter loop port orientation rotated by 90° from the case shown in FIG. 13A.

Because the port orientation of the implant loop is unknown after implantation, we examine two raster scanning maps. If we draw a line from the port to the center of the loop for both antennas to indicate their port orientations. The first map is created by placing the transmitter loop with the port orientations aligned with each other, as the two lines are in parallel. The result is shown in FIG. 13A. The second one is obtained with the port rotated by 90°, as the two lines are orthogonal, after the first raster scan. The result is shown in FIG. 13B. It is clear that the implant location can still be identified as the darkest color in the center of both maps. The asymmetric field distributions by the loops have an impact on the resonances as the surrounding pixels having different patterns of resonant frequencies.

Figure 14A:
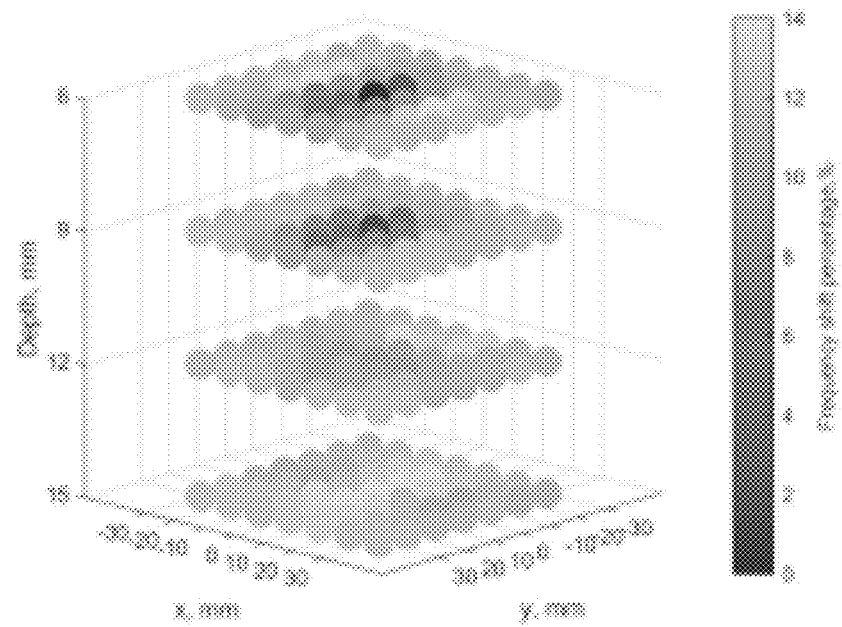
FIGS. 14A and 14B show localization maps with the transmitter loop in different depths of 6, 9, 12, and 15 mm.
Figure 14B:
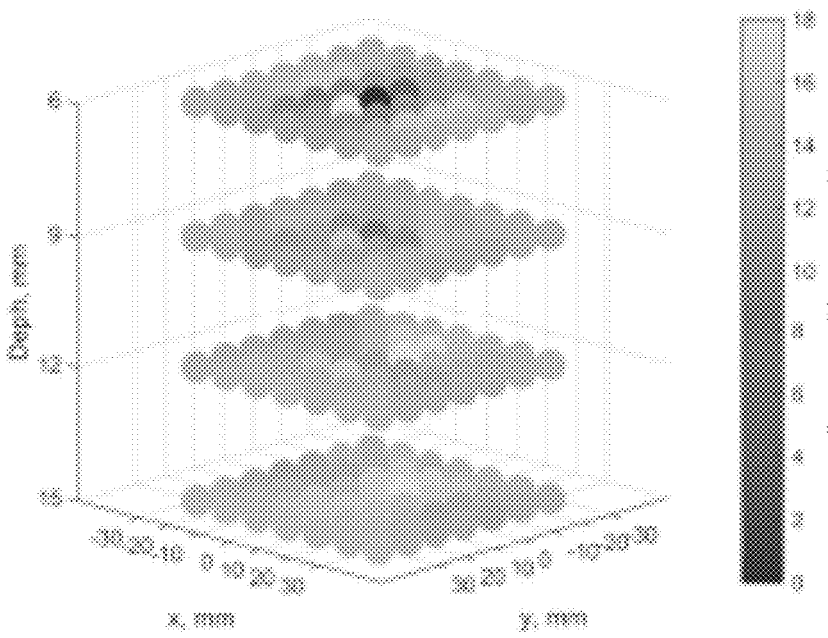

The subcutaneous implant is typically located in the hypodermics layer, which the depth is within 6 mm. In practical scenarios, the implant can be deeper. The results of mapping for an implant depth of 6, 9, 12, and 15 mm are shown in FIG. 14A. FIG. 14B compares the cases for orthogonal port orientation. The scanning image becomes noisy and less distinguished at 12 and 15 mm, compared to the 6- and 9-mm cases. It is obvious that when the port orientations are the same, the coupling is the strongest so the pixel differences are more distinct, comparing the same depths in FIGS. 14A and 14B. When the misalignment becomes greater, in addition to resonant frequencies becoming closer to the one without implant underneath, the frequencies fluctuate across pixels. Again, this is due to the 3-D field distributions of the tuned loop antennas in the tissues. Since the implant is deeper, its fields spread out to more pixels, and the transmitter can still have some coupling effects on the implant.

Figure 15:
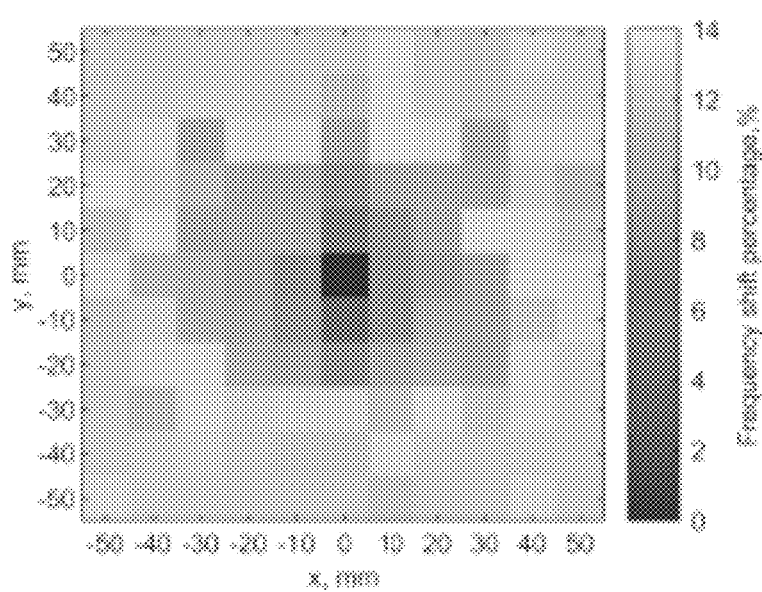
FIG. 15 shows a localization result from measurements with the implant in a depth=6 mm, where the implant is located at (0, 0).

The same ground pork phantom packed in a cube of 160 mm×160 mm×100 mm is used for experiments at room temperature. The phantom dimensions are the same as those in simulations. S-parameters are extracted at 1001 sampling points from 0 to 3 GHz to identify resonance. The implant antenna is inserted at (x=0, y=0) with a depth of 6 mm. The transmitter scans the phantom on the top with a step of 10 mm. Both loops have the same port orientation. FIG. 15 shows the measured map similar to FIG. 13A. It indicated the location of the implant clearly (dark blue pixel). Thus, it is validated the raster scan for resonance can be used to locate the implant.

Figure 16A:
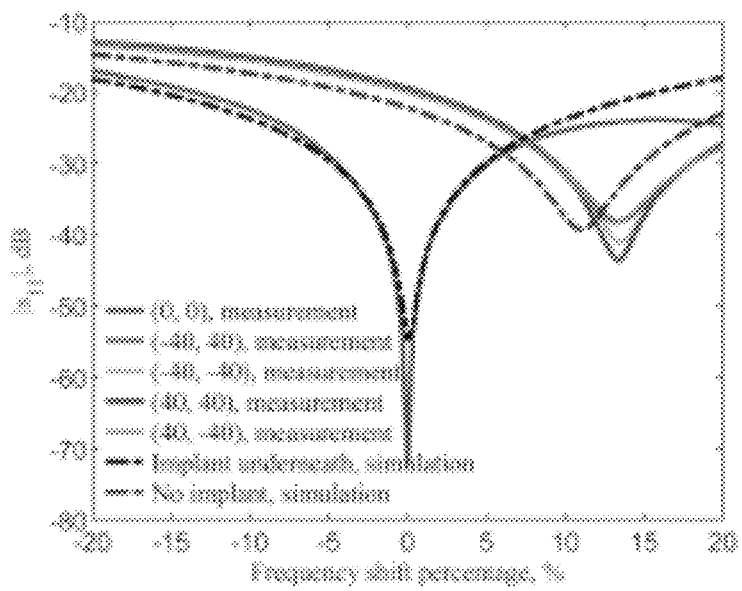
FIGS. 16A and 16B show comparison of normalized frequency shifts between measurements and simulations at the center and near corners (FIG. 16A); at the center and four adjacent pixels (FIG. 16B), where the pixel location is indicated as (x, y) in the map.

FIG. 16A compares the spectral shapes measured at the center and at four corners. Due to the difference of dielectric properties between the documented human tissues and ground pork, the resonant frequencies shift by the same amount of 0.249 GHz between simulations and measurements. The frequencies are normalized for the measured (solid lines) reflection coefficients in FIG. 16A to compare with theory (dashed lines). The normalized frequency shifts show a 13.22% shift between the case with implant underneath and that without implant. The simulations show a shift of 11.8%. The discrepancy of 1.42% is likely contributed by the differences in dielectric properties of ground pork phantom and human skin dataset.

Figure 16B:
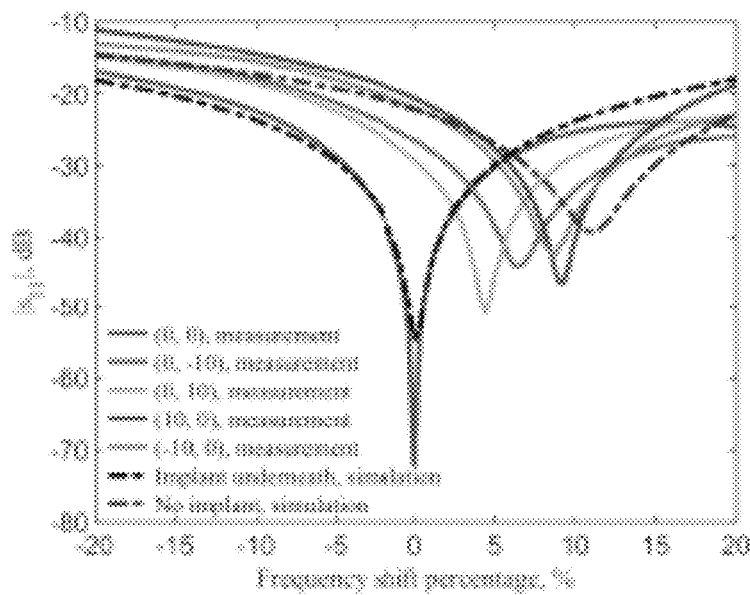

While aligned, the measured reflection coefficients $|s_{11}|$ in the implant and transmitter are −30.1 dB and −72.1 dB, as compared to the simulation results of −31.25 dB and 54.65 dB, respectively, while the transmission coefficient $|s_{21}|$ with implant underneath is −13.45 dB in measurement and −13 dB in simulation. When there is no transmitter above the implant, the measured reflection coefficients $|s_{11}|$ in the implant becomes −53.1 dB, as compared to the simulation result of −58.85 dB. FIG. 16B compares the center and four adjacent pixels. Compared to the perfect alignment between implant and transmitter, the adjacent four pixels have resonance frequency shifts between 4.43% and 9.3% in the locations (0, 10) and (10, 0), respectively. The measured reflection coefficients $|s_{11}|$ in the transmitter becomes −50.9, −44.0, −42.4, −46.2 dB instead of −72.1 dB. The obvious frequency shift patterns from FIG. 16A are due to the stronger field coupling when the transmitter and implant are closer, and the asymmetric field distributions of the transmitter in tissue. Nonetheless, the tuned transmitter can sensitively provide a distinguished frequency shift between the cases with or without an implant underneath despite the similar field distributions among adjacent points.

The frequency shifts around the implant location are distinct enough with the 1-MHz resolution with 1001 sampling points from 0 to 3 GHz. The magnitude of reflection coefficients in the adjacent pixels can also provide further clarification for the implant location. Given a finer resolution in frequency in a narrower frequency sweep range, say between −5% and 20%, to measure resonance, the localization resolution can be increased, of course.

Figure 17:
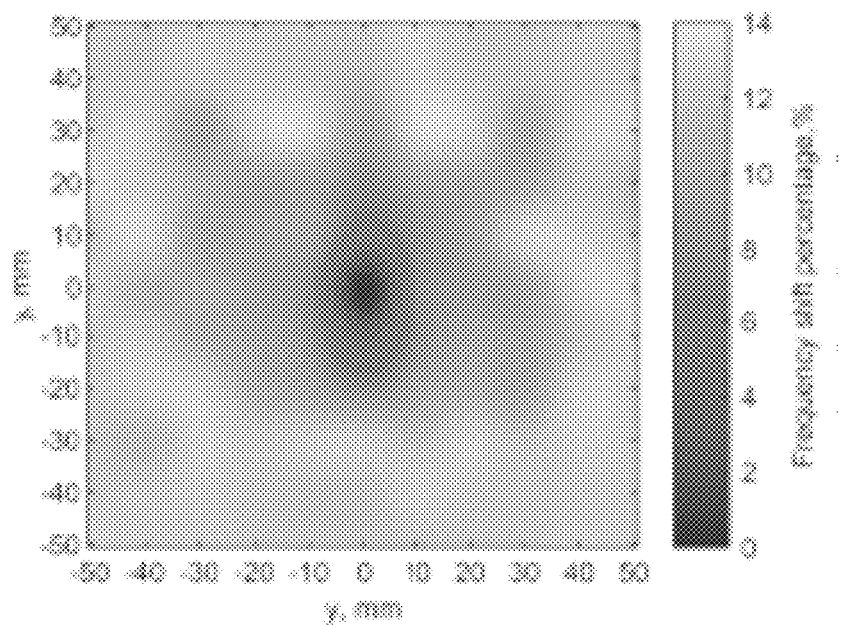
FIG. 17 shows rendering results using the cubic spline interpolation from measurement data at the depths of 6 mm.

Without increasing spatial or spectral resolutions, cubic spline interpolation is used to highlight the implant location pixels for better visualization and identification [39]. As shown in FIG. 17, the implant location can be more easily identified, compared with FIG. 15. Shape matching technique [40] along with the cubic spline interpolation can probably further enhance recognition of location.

The present invention introduces a tuning structure in the center of a loop-shaped split ring antenna, which significantly improves the resonance performance for wireless power and data transfer. By varying the distance between the loop and the metal element, the reactance, including the distributed capacitance and mutual inductance, can be tuned and match the port impedance. The metal element in the center can also serve as the space to accommodate electronics, such as microprocessor, power management, and sensor driver integrated circuits. Two designs for ISM bands 903 MHz and 2.45 GHz with a targeted implant depth of 6 mm are demonstrated. Both simulations and corresponding measurements verified the concept, as resonance being significantly improved while satisfying practical constraints for subcutaneous implants. The much improved reflection coefficient of the implant also makes it more energy efficient.

The discrepancies between simulations, conducted by documented human tissues parameters, and experiments conducted by moist ground pork phantoms, are examined and explained. The experiments validate the method allowing us to explore the effects of different implantation depths.

Considering the implant depth deviations in practical scenarios, the changes in resonant frequency and return loss in different depths up to 12 mm have been examined. The depth between 4 and 8.5 mm can maintain resonant frequency shifts less than 5% from the designed operating frequency and satisfy the requirement of reflection coefficient for implant circuitry lower than −30 dB. Such implantation tolerance provides stable performance in practical cases.

A noninvasive method to locate the implant utilizing resonance between two coils is also demonstrated. Owing to the better resonance in the implant and transmitter loops by their tuning center elements, raster scanning by the transmitter can identify the implant location with the resonant frequency. Both finite-element simulation and measurement results verify the localization concept. The relative orientations of the loops at various depths are also investigated, showing robust performance. The concept of using a transmitter/reader loop to identify subcutaneous implants can be cost effective and less risky, and quick compared to conventional X-ray methods.

Any and all aspects of embodiments of the present invention disclosed herein are disclosed to be present together in any single embodiment unless prevented by physical impossibility.

In one embodiment, the present invention comprises, consists essentially of, or consists of a planar inductive resonant coupler including: a planar loop antenna; and an element disposed within and co-planar with a loop formed by the antenna; wherein one or more antenna or element dimensions are sized to tune a coupler resonance of the coupler. In one aspect, the element is a pad element. In another aspect, the element is a loop element. In another aspect, the antenna and the element are circular, elliptical, square-shaped, rectangle-shaped, or polygon-shaped. In another aspect, the element includes a metal. In another aspect, the one or more antenna or element dimensions include an antenna inner diameter of the antenna, an antenna outer diameter of the antenna, and element diameter of the element. In another aspect, the planar inductive resonant coupler further includes a coupler substrate on which the antenna and the element are disposed. In another aspect, the planar inductive resonant coupler further includes an attachment interface on which the antenna and the element are disposed and adapted to attach the coupler to an implant device or a wearable device. In another aspect, the one or more antenna or element dimensions are sized to tune the coupler resonance by forming a selected gap width between a circumference of the element and an inner circumference of the loop. In another aspect, the coupler resonance is tuned to maximize a quality factor of the coupler for a selected coupler resonance frequency. In another aspect, the antenna and the element are adapted to be coupled to circuitry, to receive or to transmit electromagnetic energy to or from a surrounding environment, and to transmit the electromagnetic energy to the circuitry. In another aspect, the surrounding environment includes an electromagnetic power source, an electromagnetic power coupler, an electromagnetic data transmitter, or an electromagnetic data receiver, or some combination. In another aspect, the circuitry includes a sensor, a stimulator, an energy storage device, or some combination.

In another embodiment, the present invention comprises, consists essentially of, or consists of a method of making a planar inductive resonant coupler, the method including: sizing one or more dimensions of a circular planar loop antenna and an element, wherein the element is adapted to be disposed within and coplanar with a loop formed by the antenna; and disposing the element within the loop to form a gap between the loop and the element. In one aspect, the element is a pad element. In another aspect, the element is a loop element. In another aspect, the antenna and the element are circular, elliptical, square-shaped, rectangle-shaped, or polygon-shaped, In another aspect, the element includes a metal. In another aspect, the one or more dimensions of the circular planar loop antenna and the element include an antenna inner diameter of the antenna, an antenna outer diameter of the antenna, and an element diameter of the element. In another aspect, the method of making a planar inductive resonant coupler further includes disposing the antenna and the element on a substrate. In another aspect, the method of making a planar inductive resonant coupler further includes disposing the antenna and the element on an attachment interface adapted to attach the coupler to an implant device or a wearable device. In another aspect, the method of making a planar inductive resonant coupler further includes forming a selected gap width between a circumference of the element and an inner circumference of the loop. In another aspect, the method of making a planar inductive resonant coupler further includes tuning a coupler resonance to maximize a quality factor of the coupler for a selected coupler resonance frequency.

In another embodiment, the present invention comprises, consists essentially of, or consists of a method of using a tuned planar inductive resonant coupler, the method including: providing a coupler including: a circular planar loop antenna; and an element disposed within and co-planar with a loop formed by the antenna; wherein one or more antenna or element dimensions are sized to tune a coupler resonance of the coupler; disposing the coupler in an implant device or a wearable device; and sending electromagnetic energy to the coupler from an electromagnetic energy source or a data transmitter in a surrounding environment of the coupler, or receiving electromagnetic energy from the coupler with an electromagnetic power coupler or a data receiver in the surrounding environment of the coupler. In one aspect, the method of using a tuned planar inductive resonant coupler further includes disposing the coupler on a substrate. In another aspect, the method of using a tuned planar inductive resonant coupler further includes disposing the coupler on an attachment interface adapted to attach the coupler to an implant device or a wearable device.

In another embodiment, the present invention comprises, consists essentially of, or consists of a method of locating a subcutaneous planar inductive resonant coupler including: providing a subcutaneous planar inductive resonant coupler including: a circular planar loop antenna; and an element disposed within and co-planar with a loop formed by the antenna; wherein one or more antenna or element dimensions are sized to tune a coupler resonance of the coupler; providing a locating device configured to couple with the subcutaneous planar inductive resonant coupler; placing the locating device within a coupling range of the subcutaneous planar inductive resonant coupler; plotting a location for each of one or more resonant frequencies of the locating device with respect to a surface under which the subcutaneous planar inductive resonant coupler is expected to be located; and identifying a location for a specific resonant frequency of the subcutaneous planar inductive resonant coupler on the surface. In one aspect, the locating device comprises an electromagnetic power source, an electromagnetic power coupler, an electromagnetic data transmitter, an electromagnetic data receiver, or some combination.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

1. Gonzalez, A.; Goikolea, E.; Barrena, J. A.; Mysyk, R. Review on Supercapacitors: Technologies and Materials. *Renewable & Sustainable Energy Reviews* 2016, 58, 1189-1206.
2. Poonam; Sharma, K.; Arora, A.; Tripathi, S. K. Review of Supercapacitors: Materials and Devices. *Journal of Energy Storage* 2019, 21, 801-825.
3. Deb, S.; Tang, S.; Abell, T. L.; McLawhorn, T.; Huang, W.; Lahr, C.; To, S. D. F.; Easter, J.; Chiao, J. Development of Innovative Techniques for the Endoscopic Implantation and Securing of a Novel, Wireless, Miniature Gastrostimulator (with videos). *Gastrointestinal Endoscopy* 2012, 76, 179-184.
4. Bose, P.; Khaleghi, A.; Albatat, M.; Bergsland, J.; Balasingham, I. RF Channel Modeling for Implant-to-Implant Communication and Implant to Subcutaneous Implant Communication for Future Leadless Cardiac Pacemakers. *IEEE Transactions on Biomedical Engineering* 2018, 65, 2798-2807.
5. Goroszeniuk, T.; Kothari, S.; Hamann, W. Subcutaneous Neuromodulating Implant Targeted at the Site of Pain. *Regional Anesthesia and Pain Medicine* 2006, 31, 168-171.
6. Yang, X.; Fu, T.; Kota, P. K.; Tjia, M.; Nguyen, C. M.; Chiao, J. Lactate Sensors on Flexible Substrates. *Biosensors* (Basel) 2016, 6, 48.
7. Souvik Dubey; Chiao, J. Power Transfer for a Flexible Gastric Stimulator, *IEEE Bio Wireless Conference*, Austin, TX, Jan. 24-27, 2016.
8. Neihart, N. M.; Harrison, R. R. Micropower Circuits for Bidirectional Wireless Telemetry in Neural Recording Applications. *IEEE Transactions on Biomedical Engineering* 2005, 52, 1950-1959.
9. Campi, T.; Cruciani, S.; Palandrani, F.; De Santis, V.; Hirata, A.; Feliziani, M. Wireless Power Transfer Charging System for AIMDs and Pacemakers. *IEEE Transactions on Microwave Theory and Techniques* 2016, 64, 633-642.
10. RamRakhyani, A. K.; Mirabbasi, S.; Mu Chiao Design and Optimization of Resonance-Based Efficient Wireless Power Delivery Systems for Biomedical Implants. *IEEE Transactions on Biomedical Circuits and Systems* 2011, 5, 48-63.
11. Deb, S.; Tang, S.; Abell, T. L.; Rao, S.; Huang, W.; To, S. D. F.; Lahr, C.; Chiao, J. An Endoscopic Wireless Gastrostimulator (with video). *Gastrointestinal Endoscopy* 2012, 75, 411-415.e1.
12. Rao, S.; Dubey, S.; Deb, S.; Hughes, Z.; Seo, Y.; Nguyen, M.; Tang, S.; Abell, T.; Lahr, C.; Chiao, J. Wireless 449 Gastric Stimulators. *Texas Symposium on Wireless and Microwave Circuits and Systems* 2014, 1-4.
13. Rao, S.; Chiao, J. Body Electric: Wireless Power Transfer for Implant Applications. *IEEE Microwave Magazine* 2015, 16, 54-64.
14. Davies, C.; Komoroski, C.; Roy, L. Evaluation of An Innovative Spinal Cord Stimulator Platform for The Treatment of Chronic Pain. *Pain Management* (London) 2018, 8, 167-174.
15. De Wachter, S.; Knowles, C. H.; Elterman, D. S.; Kennelly, M. J.; Lehur, P. A.; Matzel, K. E.; Engelberg, S.; Van Kerrebroeck, P. E. V New Technologies and Applications in Sacral Neuromodulation: An Update. *Advances in Therapy* 2020, 37, 637-643.
16. Clinical Trial: Neuspera's Implantable Sacral Nerve Stimulation System in Patients with Symptoms of Overactive Bladder. *US Fed News Service, US State News* 2020.
17. Lam, C. K.; Rosenow, J. M. Patient Perspectives on the Efficacy and Ergonomics of Rechargeable Spinal Cord Stimulators. *Neuromodulation* (Malden, Mass.) 2010, 13, 218-223.
18. Jia, F.; Hao, H.; Meng, F.; Guo, Y.; Zhang, S.; Zhang, J.; Li, L. Patient Perspectives on the Efficacy of A New Kind of Rechargeable Deep Brain Stimulators1. *International Journal of Neuroscience* 2016, 126, 996-1001.
19. Rosenberg, J. EonR battery Recharging: Preliminary Findings of Three Prospective, Multi-centered, Post-market Studies, $24^{th}$ Annual Meeting, 2008.
20. Hornberger, J.; Kumar, K.; Verhulst, E.; Clark, M. A.; Hernandez, J. Rechargeable Spinal Cord Stimulation Versus Nonrechargeable System for Patients With Failed Back Surgery Syndrome: A Cost-Consequences Analysis. *The Clinical Journal of Pain* 2008, 24, 244-252.
21. Abejon, D.; Vancamp, T.; Monzon, E. M. A Cost-Consequence Analysis Examining the Differences Between Non-Rechargeable and Rechargeable Systems. *Anesthesiology and Pain Medicine* 2020, 10, e100308.
22. Clingan, J. A.; Patel, A.; Maher, D. P. Survey of Spinal Cord Stimulation Hardware Currently Available for the Treatment of Chronic Pain in the United States. *Front. Pain Res*.1: 572907 2020.
23. Viswanath, O.; Urits, I.; Bouley, E.; Peck, J. M.; Thompson, W.; Kaye, A. D. Evolving Spinal Cord Stimulation Technologies and Clinical Implications in Chronic Pain Management. *Current Pain and Headache Reports* 2019, 23, 1-6.
24. Dawood, A.; Brown, J.; Sauret-Jackson, V.; Purkayastha, S. Optimization of Cone Beam CT Exposure for Pre-surgical Evaluation of the Implant Site. *Dento-maxillofacial Radiology* 2012, 41, 70-74.

25. Liu, J. J.; Lutkin, J. E. Imaging of Patients Having Metal Implant Using X-ray Computed Tomography. *Journal of X-ray Science and Technology* 2009, 17, 355-365.
26. Storer, J. E. Impedance of Thin-wire Loop Antennas. Transactions of the American Institute of Electrical Engineers. Part 1. Communication and electronics 1956, 75, 606-619.
27. McKinley, A. F.; White, T. P.; Maksymov, I. S.; Catchpole, K. R. The Analytical Basis for the Resonances and Anti-resonances of Loop Antennas and Meta-material Ring Resonators. *Journal of Applied Physics* 2012, 112, 94911.
28. Bing, S., Chawang, K. and Chiao, J. C., Resonant Coupler Designs for Subcutaneous Implants. *Proceedings of the* 2021 *IEEE Wireless Power Transfer Conference, Wireless Power Week.* Jun. 1-4, 2021. pp. 1-4.
29. Andreuccetti, D. et al. An internet Resource for the Calculation of the Dielectric Properties of Body Tissues in the Frequency Range 10 Hz-100 GHz, Institute of Applied Physics "Nello Carrara" (IFAC), CNR, 1997. Available: http://niremf.ifac.cnr.it/tiss_prop/.
30. Gunasekaran, N.; Mallikarjunan, P.; Eifert, J.; Sumner, S. Effect of Fat Content and Temperature on Dielectric Properties of Ground Beef. *Transactions of the ASAE,* 48, 673-680.
31. Lyng, J. G.; Zhang, L.; Brunton, N. P. A Survey of the Dielectric Properties of Meats and Ingredients Used in Meat Product Manufacture. *Meat Science* 2005, 69, 589-602.
32. Ng, S. K.; Gibson, A.; Parkinson, G.; Haigh, A.; Ainsworth, P.; Plunkett, A. Bimodal Method of Determining Fat and Salt Content in Beef Products by Microwave Techniques. *IEEE Transactions on Instrumentation and Measurement* 2009, 58, 3778-3787.
33. van der Sman, R. G. M Model for Electrical Conductivity of Muscle Meat During Ohmic Heating. *Journal of Food Engineering* 2017, 208, 37-47.
34. Shirsat, N.; Lyng, J. G.; Brunton, N. P.; McKenna, B. Ohmic Processing: Electrical Conductivities of Pork Cuts. *Meat Science* 2004, 67, 507-514.
35. Song, K.; Kim, J.; Cho, S.; Kim, N.; Jung, D.; Choo, H.; Lee, J. Flexible-Device Injector with a Microflap Array for Subcutaneously Implanting Flexible Medical Electronics. *Advanced Healthcare Materials* 2018, 7, 1800419.
36. Park, G.; Chung, H.; Kim, K.; Lim, S. A.; Kim, J.; Kim, Y.; Liu, Y.; Yeo, W.; Kim, R.; Kim, S. S.; Kim, J.; Jung, Y. H.; Kim, T.; Yee, C.; Rogers, J. A.; Lee, K. Immunologic and Tissue Biocompatibility of Flexible/Stretchable Electronics and Optoelectronics. *Advanced Healthcare Materials* 2014, 3, 515-525.
37. Lee, C. H.; Kim, H.; Harburg, D. V.; Park, G.; Ma, Y.; Pan, T.; Kim, J. S.; Lee, N. Y.; Kim, B. H.; Jang, K.; Kang, S.; Huang, Y.; Kim, J.; Lee, K.; Leal, C.; Rogers, J. A. Biological Lipid Membranes for On-demand, Wireless Drug Delivery from Thin, Bioresorbable Electronic Implants. *NPG Asia Materials* 2015, 7, e227.
38. Liu, Y.; Xie, D.; Zhou, R.; Zhang, Y. 3D X-ray Microcomputed Tomography Imaging for the Microarchitecture Evaluation of Porous Metallic Implants and Scaffolds. *Micron* 2021, 142, 102994.
39. Reichenbach, S. E. and Geng, F. Two-dimensional cubic convolution. *IEEE Transactions on Image Processing* 2003, 12(8), pp. 857-865.
40. Belongie, S., Malik, J. and Puzicha, J. Shape matching and object recognition using shape contexts. *IEEE transactions* 508 *on pattern analysis and machine intelligence* 2002, 24(4), pp. 509-522.

What is claimed is:

1. A planar inductive resonant coupler comprising:
a circular planar loop resonator comprising a single loop; and
a circular metal pad element disposed within and coplanar with the circular planar loop resonator;
wherein one or more circular planar loop resonator dimensions or circular metal pad element dimensions are sized to tune a coupler resonance of the coupler by forming a gap with a selected equidistant gap width between a circumference of the circular metal pad element and an inner circumference of the circular planar loop resonator; and
wherein the circular planar loop resonator and the circular metal pad element disposed within and coplanar to the circular planar loop resonator are configured to establish electric fields across the gap and are configured to be coupled to circuitry, to receive or to transmit electromagnetic energy to or from a surrounding environment, and to transmit the electromagnetic energy to the circuitry.

2. The coupler of claim 1, wherein the one or more circular planar loop resonator dimensions comprise a circular planar loop resonator inner diameter and a circular planar loop resonator outer diameter, and the one or more circular metal pad element dimensions a circular metal pad element diameter.

3. The coupler of claim 1, further comprising a coupler substrate on which the circular planar loop resonator and the circular metal pad element are disposed.

4. The coupler of claim 1, further comprising an attachment interface on which the circular planar loop resonator and the circular metal pad element are disposed and configured to attach the coupler to an implant device or a wearable device.

5. The coupler of claim 1, wherein the coupler resonance is tuned to maximize a quality factor of the coupler for a selected coupler resonance frequency.

6. The coupler of claim 1, wherein the surrounding environment comprises an electromagnetic power source, an electromagnetic power coupler, an electromagnetic data transmitter, or an electromagnetic data receiver, or some combination.

7. The coupler of claim 1, wherein the circuitry comprises a sensor, a stimulator, an energy storage device, or some combination.

* * * * *